(12) United States Patent
Koved et al.

(10) Patent No.: US 6,925,638 B1
(45) Date of Patent: Aug. 2, 2005

(54) MUTABILITY ANALYSIS IN JAVA

(75) Inventors: Larry Koved, Pleasantville, NY (US); Bilha Mendelson, Haifa (IL); Sara Porat, Ramat Yishay (IL); Marina Biberstein, Oiryat Motzkin (IL)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 09/667,430

(22) Filed: Sep. 21, 2000

(51) Int. Cl.$^7$ .............................................. G06F 9/45
(52) U.S. Cl. ...................................................... 717/155
(58) Field of Search ........................ 717/114–116, 141, 717/142, 124, 118

(56) References Cited

U.S. PATENT DOCUMENTS

| | | | |
|---|---|---|---|
| 6,085,035 A | | 7/2000 Ungar | 717/46 |
| 6,094,528 A | * | 7/2000 Jordan | 717/115 |

OTHER PUBLICATIONS

Gunter Kniesel and Dirk Theisen, "JAC—Access right based encapsulation for Java", Aug. 15, 2000, John Wiley & Sons, Ltd.*

Porat, Biberstein, Koved and Mendelson, "Automatic Detection of Immutable Fields in Java", Nov. 2000, Proceedings of the 2000 conference of the Centre for Advanced Studies on Collaborative research.*

Keishi Tajima, "Static Detection of Security Flaws in Object-Oriented Databases", Jun. 1996, SIGMOD '96, pp. 341-352.*

* cited by examiner

Primary Examiner—Kakali Chaki
Assistant Examiner—Trent Roche
(74) Attorney, Agent, or Firm—Louis P. Herzberg; Dilworth & Barrese, LLP

(57) ABSTRACT

A system and method for detecting the mutability of fields and classes in an arbitrary program component written in an object oriented programming language is disclosed. A variable is considered to be mutable if a new value is stored into it, as well as if any of its reachable variables are mutable. The system and method uses a static analysis algorithm which can be applied to any software component rather than whole programs. The analysis classifies fields and classes as either mutable or immutable. In order to facilitate open-world analysis, the algorithm identifies situations that expose variables to potential modification by code outside the component, as well as situations where variables are modified by the analyzed code. An implementation of the analysis is presented which focuses on detecting mutability of class variables, so as to avoid isolation problems. The implementation incorporates intra- and inter-procedural data-flow analyses and is shown to be highly scalable. Experimental results demonstrate the effectiveness of the algorithms.

71 Claims, 3 Drawing Sheets

MUTABILITY ANALYSIS IN JAVA

BACKGROUND OF THE INVENTION

1. Field of the Invention

This invention relates to the field of object-oriented programming languages for computer programs, and, in particular, to the detection of mutability of fields and classes in an arbitrary program component.

2. Description of the Related Art

When it was introduced in late 1995, the programming language Java took the Internet by storm. A primary reason for this was the fact that Java was an interpreted programming language, which meant essentially that it used a different compiling/execution paradigm than programming languages such as C or C++. A program written in a high-level programming language, such as C or C++, which can be read, written, and understood by humans, needs to be translated into machine code that can be understood by the computer that actually runs the program. This is what a compiler does. In addition, compilers optimize the code as well as translating it. The end product of compiling, the machine code, is, by definition, machine specific, meaning that the code is uniquely addressed to the type of computer that is running it, and will not be understood by a different type of computer. A simple example of this is the fact that a program that has been compiled for a Apple Macintosh will not run on an International Business Machines (IBM) clone PC computer. This is called being "platform-dependent".

On the other hand, interpreted programming languages, such as Java, are not compiled for a particular type of computer. They are platform-independent. This is done by placing an intermediary, the Java Virtual Machine (JVM), between the compiled program and the specific platform. In other words, when a Java program is compiled, the end result is not machine code, but byte-code, which is understood by the JVM. The JVM is machine specific, and acts as an interpreter of the byte-code for the particular machine the JVM is installed in. This allows Java programs to be compiled and ported to any machine, as long as the machine has a JVM installed.

It is this platform-independence that makes Java uniquely suited to the Internet. Once a computer has JVM installed, it doesn't matter whether the computer is Apple, Wintel PC, Sun, Digital, etc., a Java compiled byte-code program downloaded over the Internet will run on it. Although Java is generally run as an interpreted programming language, it should be noted that it can be optimized and compiled statically or during runtime (i.e., Just-In-Time compilers).

Java is an Object-Oriented Programming (OOP) language. This means that the focus is on objects, rather than on procedures (as in C or BASIC). Roughly speaking, an object contains data and the methods that operate on that data. Programming in Java can be understood as writing descriptions of different objects.

More particularly, in OOP, a "class" is a collection of data and methods that defines the implementation of a particular kind of object. A class definition defines "instance variables" and "class variables", as well as specifying the "interfaces" the class implements and the immediate "superclass" of the class. In broad terms, a class can be understood as a general definition, and an object is an "instance" of a class. For example, class named Circle might be defined, with variables for radius and the location of the origin point. A particular circle c might be instantiated, with particular values for the radius and origin location, by calling on the Circle class. Because the radius and origin location are particular to that instance c of the Circle class, they are "instance variables". By contrast, a "class variable" is a data item associated with the class as a whole. For example, the value pi=3.14 might be a class variable in the Circle class. Another example would be a variable num_circles which is defined in the Circle class, and which is increased by one every time a circle is instantiated. These class variables are associated with the whole class, rather than an instance, and are declared with the modifier static. Classes in Java form a class hierarchy, where a class may be a "superclass" or a "subclass" to another. For instance, Shapes might be a superclass of Circle, and GraphicCircle, a class that provides the ability to manipulate and draw instantiated objects of the Circle class, could be a subclass of Circle. A subclass inherits behavior from its superclass.

In Java, a "package" is an extensive set of classes, and Java has default packages that programmers use for common tasks. For example the java.io package has classes that handle input and output, the java.net package has classes that support networking functionality, and the java.awt package provides classes that create graphical user interface components.

Continuing with some of the unique features of Java, it should be noted that Java is a dynamic language. This means that any Java class can be loaded into a running Java interpreter at any time. These dynamically loaded classes can then be dynamically instantiated. Java is also a language built for networking. Using the java.net package, it is as easy to access files or resources over a network as files or resources located locally. Because Java is both dynamic and built for networking, it is possible for a Java interpreter to download and run code from across the Internet. This is what happens when a web browser downloads and runs a Java applet (an applet is a class that is loaded and run by an already running Java application). Presently, Internet Java applets are the ubiquitous use of Java, but Java has the capability of creating any type of program that dynamically uses the distributed resources of a network.

Because of the inherent security risks involved in a system that can download active code over a network, Java has several lines of defense against malicious code. First, Java, unlike C or C++, has no pointers, which can be used to access memory outside the bounds of a string or an array. Related to its lack of pointers, Java disallows any direct access to memory, thus stopping any security attack from that direction. Second, the Java interpreter performs a byte-code verification process on any untrusted code it loads, which prevents malicious code from taking advantage of implementation weaknesses in the Java interpreter. Third, Java uses a security "sandbox model", where untrusted code is placed in a "sandbox", where it can play safely, without doing any damage to the full Java environment. When an applet is running in the sandbox, there are numerous security restrictions on what it can do. By this means, rogue code is prevented from interfering with other applications running in the same Java environment, or gaining unauthorized access to resources in the underlying operating system or network. A fourth layer of security can be provided by attaching digital signatures to Java code. These digital signatures can establish the origin of the code in a cryptographically secure and unforgeable way. A user specifies whether a particular source is trusted, and, if code is received from a trusted source, it is accepted and run.

Another feature of Java is its method of memory allocation and deallocation. In C or C++, the programmer allocates memory and then deallocates memory in a deliberate fashion. In other words, the C++ programmer explicitly allocates memory for holding arrays, variables, etc. at the beginning of an object or method, and then explicitly deallocates that memory when it will no longer be used. By contrast, the Java programmer neither allocates nor deallocates memory. Instead, Java uses garbage collection, which works as follows: the Java interpreter knows what objects it has allocated. It can also figure out which variables refer to which objects, and which objects refer to which other objects. Because of this, it can figure out when an allocated object is no longer referred to by any other object or variable. When such an object is found, it can be safely destroyed by a "garbage collector".

Lastly, Java uses components, application-level software units which are configurable at deployment time. Currently, there are four types of components: enterprise beans, Web components, applets, and application clients. Enterprise beans implement a business task or business entity. Web components, such as servlets, provide services in response to requests. Applets, as mentioned before, typically execute in a web browser, but can execute in a variety of other applications or devices that support the applet programming model. Application clients are first-tier client programs that execute in its own Java Virtual Machine. Components are provided life cycle management, security, deployment, and runtime services by containers. Each type of container (Enterprise Java Bean (EJB), Web, Java Server Page (JSP), servlet, applet, and application client) also provides component-specific services.

As made clear from the above description of Java, an essential attribute of Java is the localization of knowledge within a module, which is known as "encapsulation". Because objects encapsulate data and implementation, the user of an object can view the object as a black box that provides services. Instance variables and methods can be added, deleted, or changed, but as long as the services provided by the object remain the same, code that uses the object can continue to use it without being rewritten.

However, problems occur when one object or component depends on the state of a shared variable or object and another component or object changes the state of that variable or object. In this case, in other words, the shared object is not encapsulated. This is sometimes known as an isolation fault. The mechanism for sharing state in Java is via class variables, i.e., fields declared with the static modifier. A class variable is accessed via the class name, rather than via an object reference. Thus, the variable is considered to be shared by all the code that can access the declaring class.

These isolation faults are of particular importance because of the rapid development of the Java component (applets, servlets, Java Beans and Enterprise JavaBeans) market and the use of Java to develop middleware, such as the AppletViewer used by web browsers to run applets, Java Server Toolkit (JST) to run servlets on servers, and Containers to run EJBs. The reference implementations of these middleware systems are based on the concurrent execution of multiple components in a single instance of the Java runtime system. The Java runtime system is the software environment in which programs compiled for the JVM can run. The runtime system includes all the code necessary to load programs written in the Java programming language, dynamically link native methods, manage memory, handle exceptions, and an implementation of the JVM, which may be a Java interpreter.

Isolation faults among multiple concurrently or serially executing programs can lead to numerous problems, especially in the areas listed below:

Integrity—some state information held in global fields/objects can be modified by any program running in the JVM. One such example is the default locale (country, language, variant). If two or more programs depend on this global state information, and they both try to change the default value, results of their execution are likely to be unpredictable.

Security—the ability to change states or observe state changes leads to security exposures. In some cases, global fields that belong to classes that may hold, at run-time, references to objects that are instances of subclasses that define overriding methods. These methods may perform operations that are unintended by the application developer, and may result in malicious behavior (e.g., opening a GUI window with a userid/password prompt). Also, malicious code can change the state of the Java runtime in unpredictable ways. An actual implementation problem in the Java Development Kit (JDK) that occurred in version 1.1.1 was due to object sharing. As a result, an unprivileged applet was able to impersonate a trusted signature, causing a serious security fault.

Compliance with the Component Model—application code may run into scalability problems. Often application code will use global variables to share state information between instances of the class. The problem is that in some of the application models, an instance of an EJB may be created in one container, retired to secondary storage, and then reactivated in a different container. When reactivated, the state information of the class variable/instance variable is stored in a different container. The net result is that there may be memory leaks—information is created and stored in variables, but never released—and the EJBs are no longer location transparent.

Therefore, there is a need to identify mutable variables, those variables that can be changed by more than one component, in order to identify and stop isolation faults.

SUMMARY OF THE INVENTION

An aspect of the present invention is to provide a system and method for identifying mutable variables in an object-oriented programming language program.

Another aspect of the present invention is to provide a system and method for identifying isolation faults in an object-oriented programming language program.

Another aspect of the present invention is to provide a system and method for maintaining integrity among various object-oriented programming language components running in an interpreter by identifying isolation faults in said components.

Another aspect of the present invention is to provide a system and method for reducing security exposures by identifying isolation faults in an object-oriented programming language program.

Another aspect of the present invention is to provide a system and method for maintaining the ability to ensure compliance with the component model by identifying isolation faults in said program components.

To achieve these and other aspects, there is provided a system and method for detecting the mutability of fields and classes in an arbitrary program component written in an object oriented programming language. According to the present invention, a system and method is described where all possible state modifications of each variable and each object in the program component are determined, said state modifications being made by methods within the program component; and all possible breakages of encapsulation of each variable and each object in the program component are determined, said breakages of encapsulation being made by methods that are within the program component.

According to the present invention, there is provided a system and method of detecting mutability of classes in an object-oriented programming language component. In the system and method, a set of classes is obtained, each of said classes being classified as one of mutable, immutable, and undecided, and then each undecided class is tested. The undecided class test comprises testing each non-static field in the undecided class, re-classifying said undecided class as mutable if any non-static fields in said undecided class are mutable; and re-classifying said undecided class as immutable if all non-static fields in said undecided class are immutable. The testing of each field in the undecided class comprises determining possible state modifications of each variable and each object in said each field, said state modifications being made by methods within the analysis scope; determining possible breakages of encapsulation of each variable and each object in said each field, said breakages of encapsulation being made by methods that are within the analysis scope; classifying said each field as immutable if no possible state modifications or breakages of encapsulation are found; classifying said each field as mutable if possible state modifications or breakages of encapsulation are found; and classifying said each field as undecided if there is insufficient class mutability information. The testing each undecided class step is repeated until a number of undecided classes after a repetition of said testing step is identical to a number of undecided classes before the repetition of said testing step; and then the remaining undecided classes are re-classified as mutable classes.

According to the present invention, a system and device for detecting the mutability of variables, objects, fields, and classes in an object-oriented programming language component is provided. The system and device comprises a mutability analyzer with three layers: a first layer of at least one core library and at least one data-flow analysis engine, for providing a particular abstraction of the program component; a second layer of at least one utility module, for using the results of the at least one data analysis engine to generate basic results; and a third layer of at least one mutability sub-analysis module, for generating final results.

BRIEF DESCRIPTION OF THE FIGURES

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
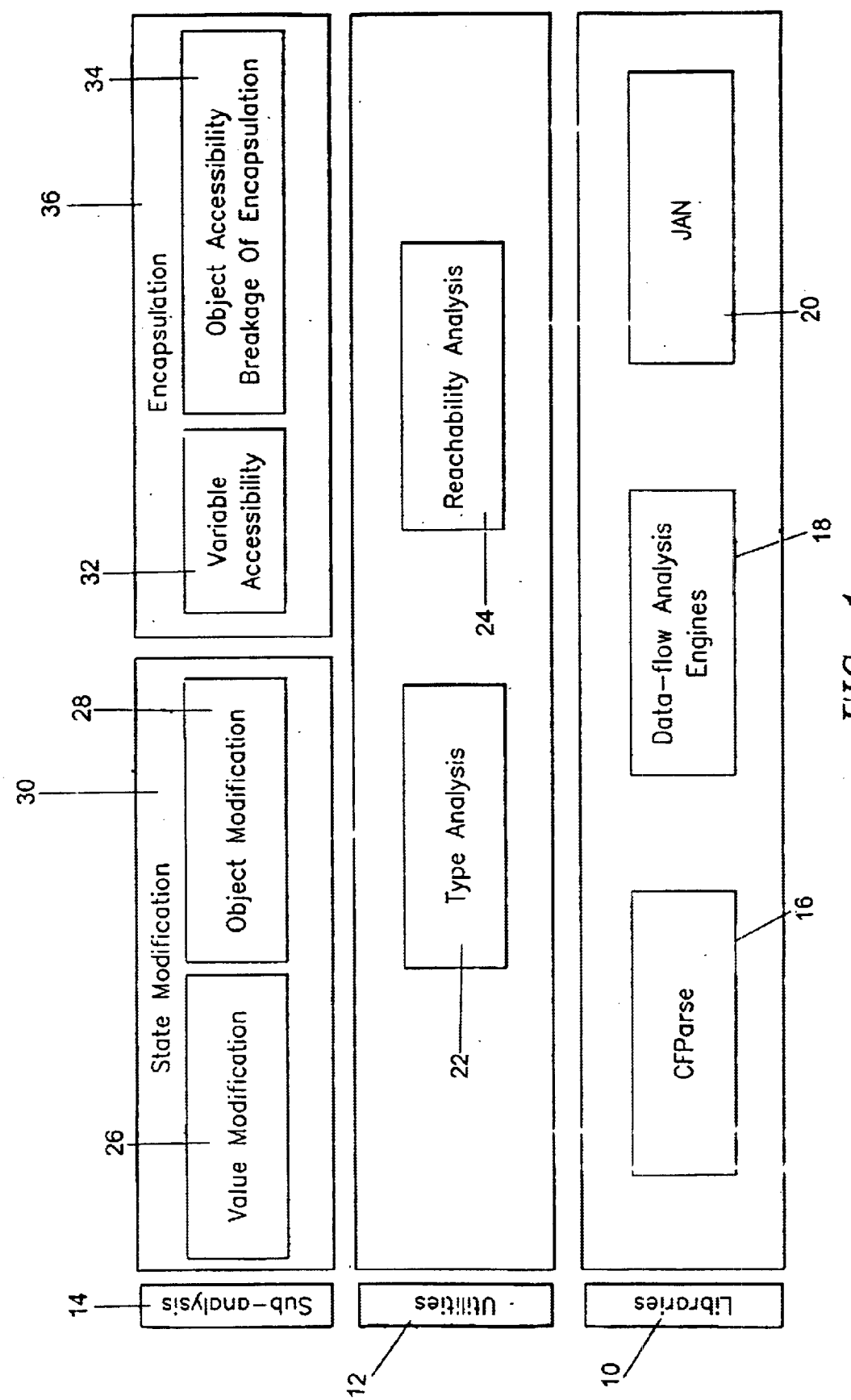
FIG. 1 is a block diagram of a Mutability Analyzer according to the preferred embodiment of the present invention.

A preferred embodiment of the present invention will be described hereinbelow with reference to the accompanying drawings. In the following description, well-known functions or constructions are not described in detail since they would obscure the invention in unnecessary detail.

The preferred embodiment of the present invention is intended to provide a device and method for detecting mutability of fields and classes in an arbitrary Java component. Specifically, a static analysis that can list all immutable classes and fields, as well as identify locations where mutation may be possible, is described. In the preferred embodiment of the present invention, a variable is considered mutable if its value, or the value of any variable reachable from it, is modified after its initialization point. In particular, the algorithms focus on an open world analysis scope (or component analysis), where all of the code to be executed is not necessarily available at the time of analysis. The preferred embodiment is in the context of Java, but it is also applicable to other object-oriented programming (OOP) languages.

The preferred embodiment of the present invention uses a set of algorithms that incorporate data-flow techniques for mutability analysis of Java components. The focus is on the analysis of software components (e.g. libraries or beans) rather than whole programs. This is achieved by linking the notion of mutability to the notions of encapsulation and scoping. In the preferred embodiment, isolation faults arise when composing components together, where one component depends on the state of a shared variable or object and another component changes that state.

In the preferred embodiment of the present invention, a Mutability Analyzer is used to perform static analysis of an open-world scope on a Java component in order to validate the set of algorithms. The Mutability Analyzer classifies each static field and each class in the component as mutable or immutable. Although the Mutability Analyzer according to the preferred embodiment of the present invention is very conservative, other embodiments could be less conservative.

The remainder of this application is organized as follows. Section I provides the definitions used in the mutability analysis. Section II presents static analysis to determine mutability in the realm of component programming. The algorithm is described via a set of sub-analyses. Section IV describes the Mutability Analyzer tool and shows experimental results. Section IV provides a conclusion and presents ideas of how to further enhance the tool.

I. Definitions

In this section, there are introduced definitions of state in Java programs, where variables can hold primitive values (e.g. character values or integer values), or references to objects. Next, formal definitions to address mutability issues are presented. In the preferred embodiment of the present invention, the type safety and access modifiers of the Java language are assumed and taken advantage of. As will be discussed below, the analysis acts on classfiles, and classfile terminology will be used.

A. Variable State and Object State

An object in Java is either a class instance or an array. Object instantiation involves creation of a set of instance variables or array components, respectively. Thus, an object represents an aggregation of associated variables. A class variable in Java corresponds to a field declared within a class declaration using the static modifier. Note that fields declared within an interface declaration are necessarily defined static. In contrast, an instance variable corresponds to a field declared within a class declaration without the static modifier. A class instance is an aggregation of variables corresponding to non-static fields declared in this class and in all of its ancestors. A class type implements a non-static field if its instances contain a variable associated with that field.

For primitive types, the state of a variable is defined by the primitive value which it holds. However, a variable holding a reference to an object is more complex, as it may indirectly refer to other variables. In other words, the state of a reference-type variable recursively depends on the state of the referenced object. The following notions are formally distinguished:

Value-state of a variable is value held in the variable.

State of a variable is defined by the set of all the value-states of the variables that are reachable from it.

State of an object is defined by the set of states of all its associated variables.

Obviously, the state of a primitive variable coincides with its value-state. The state of a reference type variable, whose value-state is non-null, is recursively defined by the variable's value-state together with the state of the referenced object.

B. Immutability Definitions

In order to define immutability of a variable or an object, a specific execution point when it is considered to be "fully created" must be referred to. This point is referred to as the initialization point of the variable or the object, and is defined below:

The initialization point of a class variable is upon completion of its corresponding <clinit> method.

The initialization point of an instance variable or a class instance is upon the completion of a corresponding <init > method.

The initialization point of an array instance or its components is upon execution of a corresponding array creation instruction (i.e., newarray, anewarray, or multianewarray).

Now that the initialization point is defined, the immutability definitions can be made:

A variable or an object is immutable if and only if its state never changes after the corresponding initialization point.

A field is immutable if an only if all the variables that correspond to that field are immutable.

A class is immutable if and only if all non-static fields implemented by it are immutable.

Note that since abstract classes and interfaces cannot be instantiated, their mutability is not considered here.

For the purposes of the preferred embodiment, the state of an object is determined through the variables that are explicitly corresponding to non-static fields. However, the JVM may implicitly attach other storage locations with the object. One such implicit variable, or "hidden" field, is the lock associated with every Java object. However, the definitions imply that is an object has no instance variables, then it is immutable. Thus, since java.lang.Object has no declared non-static fields, it is defined as an immutable class.

C. Access Modifiers and Access Control

Java provides basic means for controlling access to objects via access modifiers: private, public and protected. These modifiers restrict the visibility of classes and fields. Another access modifier is final. This modifier provides partial support for preventing undesired mutability of variables. Assignments to variables that correspond to a final field are forbidden by the JVM. Thus, once the JVM initializes the fields, their value-states cannot be modified. However, if such a variable holds a reference to a class instance, then the state of the referenced object may be changed by operations on the object, although the variable will always refer to the same object. This also applies to arrays. An array component may be changed although the value-state of the variable corresponding to a final field that refers to the array instance will remain immutable. Note that the final modifier on methods and classes has a totally different interpretation, affecting inheritance and overriding relationships between classes and methods. A class declared as final may not be subclassed. One of the consequences for the mutability analysis if that whenever a final class is the declared type of a variable, it is also its runtime type. Thus, a final primitive field is always immutable; so is a final reference-type field whose declared type is a final immutable class.

In addition to the access modifiers, broader scoping and access constraints can be enforced by various security and hierarchical class loading mechanisms offered by the Java runtime, e.g., restrictions on addition of new classes to some packages are enforced by the Security Manager. The discussion of scoping constraints provided by the Java runtime security system is beyond the scope of this application.

C++ contains a friend specifier that allows cross package member access. In contrast to C++, Java exploits the Java runtime security system to restrict access to methods and protected Java resources. Java provides (at the source level) some "friendship" relation between classes through the concept of nested classes and interfaces, which includes non-static classes referred to as innerclasses. These classes are part of the contract or implementation of their enclosing type, and thus have the same accessibility choices as other members. However, at the level of the JVM, no such nesting relationship exists. In practice, the compiler generates synthetic fields and synthetic access or methods to afford access between members of nested and enclosing classes. What seems to be stricter accessibility rules on the source level may actually be weaker protection at the object code level.

Nevertheless, protection via access modifiers is limited. Java code may use native methods (non-Java code) and reflection (classes/methods in java.lang.reflect) to access class members without adhering to the Java access modifiers. Security mechanisms are generally used to restrict accesses that violate Java access rules. The analysis here does not process native code, nor does it take into account dynamic effects resulting from reflection. There are approaches other than static analysis (e.g., annotations) which could be used to account for native code and reflection behavior.

II. Mutability Analysis

In order to determine mutability of a variable, one should be able to analyze all the methods that may modify its state. The analysis presented here does not address detection of actual instantiation of classes. Thus, a variable would be identified as immutable if it can be shown that there are no methods which may modify its state. Availability of all the modifiers/accessors of a particular variable depends on the scope of the analysis. The two extremes are distinguished as follows:

a closed-world analysis scope where all symbolic references refer to analyzed classes, and all possible targets of runtime invocations are defined in analyzed classes.

An open-world analysis scope where any arbitrary set of classes are analyzed.

This kind of analysis is also referred to as component analysis.

In closed-world processing, mutability analysis would identify the set of direct modifiers of variables states. In contrast, an open-world mutability analysis should also identify the situations that expose variables to potential modification by code outside the analysis scope, and conservatively classify such variables as mutable. The notions of variable encapsulation and its breakage so as to facilitate the open-world analysis are defined as follows:

A variable Is encapsulated if all references to objects reachable from it are defined by code within the analysis scope.

A variable encapsulation is broken by an instruction in an analyzed method, if that instruction may cause a mutable object reachable from the variable to become accessible to code outside the analysis scope.

Note that exposure of immutable objects does not imply breakage of encapsulation since by its definition encapsulation is only concerned with mutable state.

A. Mutability Sub-analyses

Figure 4:
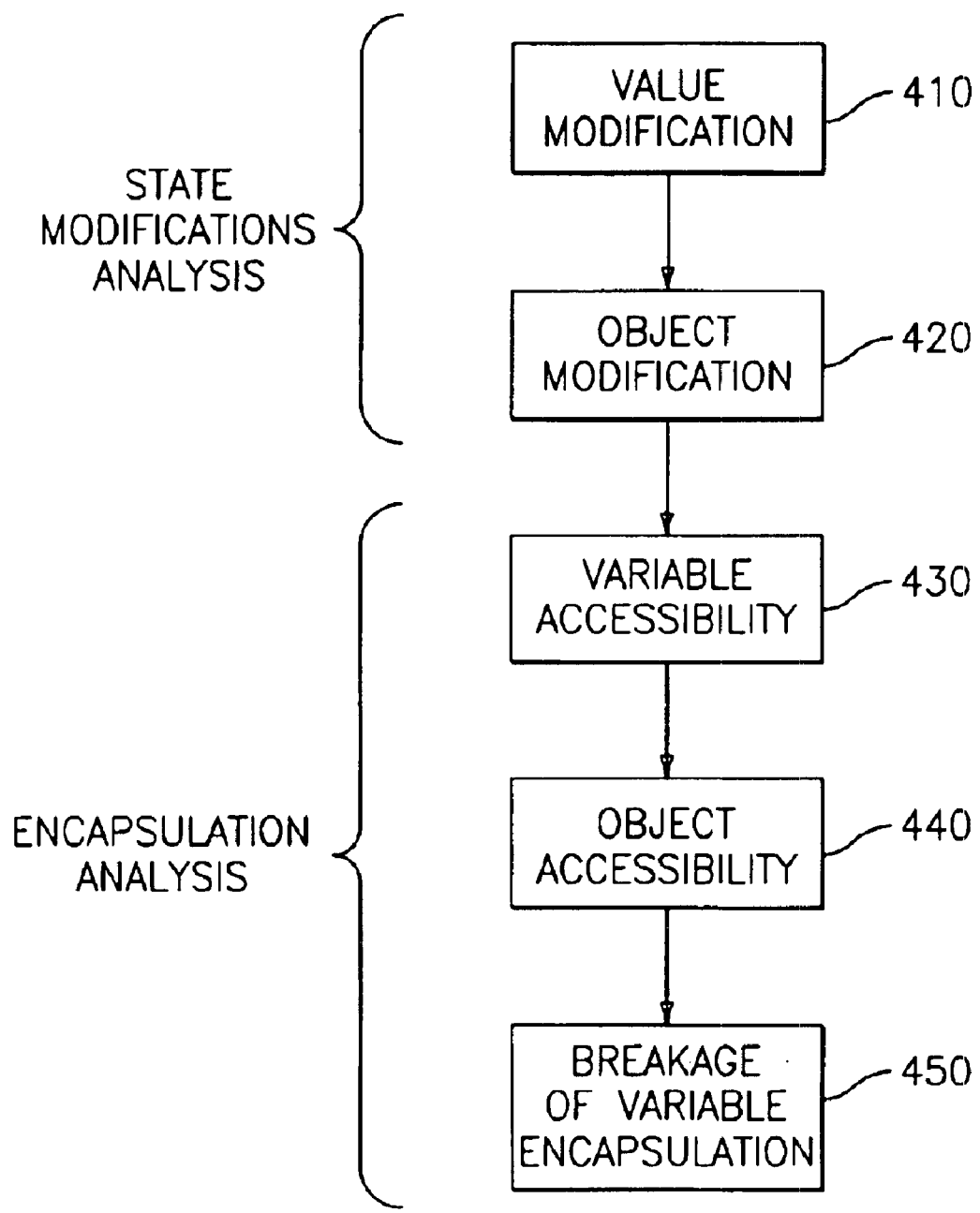
FIG. 4 is a flowchart of the sub-analyses of the mutability analysis according to the preferred embodiment of the present invention.

The mutability analysis is broken down into two major parts, or sub-analyses, as shown in FIG. 4 and described below:

State modification analysis is used to determine possible modification of a variable's state by methods in classes within the analysis scope. Sub-analyses within the state modification analysis detect:

Value modification—modification of the variable's value-state by code within the scope (step 410)

Object modification—modification of the state of the referenced object by code within the scope (step 420)

Encapsulation analysis is used to determine possible modification of a variable's state from outside the analysis scope, i.e. by methods defined in classes that are not part of the analyzed component. Sub-analyses within the encapsulation analysis detect:

Variable accessibility—modification of the variable's value-state from outside the analysis scope (step 430)

Object accessibility—variable is not encapsulated upon its initialization point (step 440)

Breakage of variable encapsulation (step 450)

Each sub-analysis handles a spectrum of situations that cause variable mutability, some of which are not trivially perceived. Example 1 illustrates several such situations. Assume that the analysis scope includes the class Sample and the Java API classes.

EXAMPLE 1

```
public class Sample{
/******************************************************
* Fields accessible from outside the component        *
******************************************************/
public Object anObject;      // variable and referenced object
                             // are accessible
public final int[ ] anArray = {1, 2, 3};   // referenced object
                             // is accessible
*********************************
* private fields                *
*********************************
private Vector privateData;
/******************************************************
* Constructors causing accessibility of               *
*      referenced object of privateData               *
******************************************************/
public sample ( ) {
   privateData – new Vector ( );
   privateData.add (anArray);   // anArray is an
                                // accessible variable
   }
   public sample (Object data) {
   privateData – nev Vector ( );
   privateData.add(data);       // data is referenced
                                // from outside
}
```

-continued

```
/******************************************************
* Methods causing modification of privateData         *
******************************************************/
public void resetData ( ) {
   privateData – new Vector( ):    // value modified
}
public void removeData ( ) {
   privateData.removeAllElements( );   // value unchanged,
                                        // state modified
}
/******************************************************
* Methods breaking encapsulation of privateData       *
******************************************************/
public void addData (Object data ) {
   privateData.add(data)            // parameter becomes
                                    // part of the state
}
public Object [ ] getData ( ) {
   return privateData.toArray ( );  // a mutable part of the
                                    // state is returned
}
public boolean isEqual (Vector v) {
   return v.equals(privateData);    // passing part of state
                                    // to an external method
}
public void exposeData ( ) {
   anObject – privateData;          // aliasing part of
                                    // state with accessible
                                    // variable
}
public void exposeData(object [ ] array {
   array [0] = privateData.elementAt (0);   // aliasing with
                                             // a parameter
}
public object [ ] exposeData (int i) {
   Object [ ] array – new Object [1];
   array [0] – privateData.elementAt (i);
   return array;                    // aliasing with a
                                    // returned object
}
}
```

The following explains the mutability scenarios in Example 1.

State Modification Sub-Analysis

Value modification: method resetData ( ) sets a new value in privateData.

Object modification: both methods removeData ( ) and addData(Object) do not change the value of private-Data but modify the Vector object referenced by it.

Encapsulation Sub-Analysis

Variable accessibility: anObject is both non-final and non-private and thus its value-state can be modified from outside the analysis scope.

Object accessibility:

The objects referenced by anObject and anArray are accessible since both fields are non-private; anArray reference is mutable array and anobject may reference a mutable object. The states of these objects can be modified from outside the analysis scope.

privateData is not encapsulated upon completion of both constructors. In the case of Sample ( ), a reference to a mutable object which is part of the state of privateData can be obtained by code outside the analysis scope via anArray. This reference can be subsequently used to modify the state of privateData. In the case of Sample (Object), a reference to the parameter is held in variable defined by the constructor caller, which is not necessarily within the analyzed component. This alias can later be used to modify the state of privateData.

Breakage of variable encapsulation:
  addData (Object) accepts an object which becomes part of the state of privateData. Since this method may be called from outside the analysis scope and its parameter may be a mutable object, the encapsulation of privateData may be broken. Likewise, exposeData (Object [ ]) may be called from outside the analysis scope and part of the state of privateData becomes part of the state of the parameter.
  getData( ) and exposeData(int) may be called from outside the analysis scope. In both methods, the returned object's state contains parts of the state of privateData.
  isEqual (Vector) passes part of the state of privateData as parameter to a virtual method invocation. The invoked method may reside outside the analysis scope.
  ExposeData( ) causes sharing of state between privateData and an accessible variable anObject.

Next, a high-level data-flow algorithm is introduced to perform conservative static component analysis. Mutability analysis computes information about the potential behavior of the code in terms of the variables that may be created during runtime and their runtime types.

B. High-level Mutability Analysis Algorithm

The scope of the analysis is identified by a given set of classfiles forming a Java component. Each classfile corresponds to an analyzed class or interface. The scope is open, so a given classfile may include references to classes or interfaces whose classfiles are outside the analysis scope.

Conservative assumptions are applied whenever the analysis requires unavailable cross-class global information. Classes outside the analysis scope are assumed to be mutable. Classes that extend classes which are outside the analysis scope are assumed to be mutable because they may inherit mutable instance variables. Similarly, whenever an analyzed method contains a method invocation (invokestatic, invokevirtual, invokespecial, invokeinterface), the analysis applies conservative assumptions when it decides that there might be a target implementation residing outside the analysis scope.

As stated above, a non-abstract class is immutable if all the non-static fields implemented by it are immutable. On the other hand, determination of a (reference-type) variable's encapsulation is dependent on the known set of immutable classes. For example, if the class variable that corresponds to a public final static field may refer to an instance of a mutable class, then it would be considered to be non-encapsulated and therefore mutable. Otherwise, since every possible object referenced by that class variable is immutable, the field is considered to be immutable. Thus, mutability/immutability of non-static fields and of classes is interdependent. Therefore, the analysis requires iterative processing. Each iteration determines immutability of non-static fields (and thereby immutability of classes) based on a set of already determined immutable classes, until a fixed point is reached (e.g. until the classifications remain the same before and after an iteration; see details below). If there are classes whose immutability was not established during the iterative process, they are conservatively considered to be mutable. In contrast, mutability/immutability of static fields (class variables) does not affect mutability of classes, and is computed after the sets of mutable/immutable classes is known.

Each analyzed non-abstract class and each of its implemented fields are classified during the course of the algorithm as mutable, immutable, or undecided. Intuitively, the undecided classification indicates that further analysis (having classified more classes as either mutable or immutable) will eventually change the classification to mutable or immutable. The analysis user provides as input to the algorithm a (possibly empty) set of classes and fields classified as mutable, and a (possibly empty) set of classes and fields classified as immutable.

The algorithm starts with a given set of mutable and immutable classes and fields. Other classes and fields in the analysis scope are marked undecided. For example, the (widely used) class java.lang.String requires complex techniques for bytecode analysis and also native code analysis in order to properly establish its immutability. Thus, if this class is part of the analysis scope, it is generally expected to be initially classified as immutable so as to get more accurate results for other classes. In addition, if the scope of the analysis does not contain all the superclasses of an analyzed class, the user may provide the full list of non-static fields to be implemented by that class. Upon completion of the algorithm, every class and every static field is classified either as mutable or as immutable.

1) Determining Mutability of a Certain Field

In the preferred embodiment of the present invention, the routine TestField is used in the algorithm to determine mutability of a given undecided field, based on a set of mutable, immutable and undecided classes. The input field is specified by its name and the declaring class. For a non-static field, the implementing class is also provided. The routine uses the information on class mutability (as derived from the classes' classification) to set the classification of the given field to be mutable or immutable, or leave it as undecided. It may occur that a field cannot be classified as immutable, but could be if more of the classes currently classified as undecided were reclassified as immutable. In the case of insufficient class mutability information, a field's classification remains undecided. If every non-abstract class is classified either mutable or immutable (which is the case when TestField is invoked for static fields), then upon completion of TestField, the field is classified either as mutable or as immutable.

Note that in order for the routine to determine the mutability of the given undecided field, it ought to refer to the initialization point that corresponds to that field. If the field is a static field, then the initialization point is determined upon completion of the containing class initializer <clinit>. Otherwise, the initialization point is defined as the completion of the corresponding instance constructor <init>.

The following outlines the structure of the TestField routine:
1. obtain a set of classes, each classified as mutable, immutable or undecided
2. for every variable that corresponds to Afield, test for satisfaction of the following conditions:
   A. Value modification: value-state may be modified by a method that can be invoked after the initialization point
   B. Object modification: state of the referenced object may be modified by a method that can be invoked after the initialization point
   C. Variable accessibility: value-state can be modified from outside the analysis scope
   D. Object accessibility: variable may not be encapsulated upon its initialization point
   E. Breakage of variable encapsulation: variable encapsulation may be broken by a method that can be invoked after the initialization point 3. if none of the conditions A–E is satisfied, classify the field as immutable
4. else, if there is currently insufficient class mutability information (as defined above), leave the field's classification as undecided
5. else, classify the field as mutable

2) Determining Mutability of all Component's Fields and Classes

Next the main iterative processing that uses the TestField routine to establish mutability of classes and fields is described. It obtains an initial classification of some fields and classes as mutable or immutable, temporarily classifies all the other fields and classes as undecided.
1. do
   /* determine mutability of classes and non-static fields */
   2. for every non-abstract class classified as undecided
   /* determine mutability of non-static fields implemented by class */
   3. if the full list of non-static fields implemented by the class is unknown
      /* there might be a mutable non-static field implemented by the class */
   4. classify the class as mutable; skip to the next class
   5. if there exists a non-static mutable field implemented by the class
   6. classify the class as mutable; skip to the next class
   7. for each non-static undecided field Afield implemented by the class
      TestField(Afield)
   8. if Afield is classified as mutable
   9. classify the class as mutable; skip to the next class
      /* all non-static fields implemented by the class are either undecided or immutable */
   10. if all non-static fields implemented by the class are immutable
   11. classify the class as immutable
      /*end of for */
12. until the set of classes classified as undecided has not been reduced in the current iteration
   /* reached a fixed point */
13. for every class classified as undecided
14. classify the class as mutable
   /* determine mutability of static fields */
15. for every analyzed class or interface
16. for every static undecided field Afield declared within the class TestField(Afield)

III. The Mutability Analyzer Tool

In this section, the Mutability Analyzer tool which performs static mutability analysis is described. The tool performs an open-world analysis on a given Java component, and classifies each static field and each class in the component as mutable or immutable. As its output, the tool produces a list of mutability causes for those classes and fields in the component that are classified as mutable. In particular, for each static field, the tool reports a list of conditions (A–E), as defined in TestField, that do not hold for this field, along with additional information. The exception is with conditions D and E; the same mutability cause is reported if any of these conditions is not satisfied. The reason is that the processing performed is very similar for both conditions.

A. TestField Implementations A primary objective of the tool is to run on very large components. The implementation is designed with a special emphasis on scalability. As a result, different TestField routines were developed, one for static fields and the other for non-static fields. The two implementations of TestField differ in the analyses they employ to test conditions A–E, as specified in the previous section. Table 1 describes these differences.

TABLE 1

TestField variations in the Mutability Analyzer tool

| Condition | TestField for non-statics | TestField for statics |
|---|---|---|
| A. Value modification | (1) A method, which is not a declaring class instance initializer <init>, has a putfield that refers to that field, or (2) A putfield in an <init> that refers to that field affects an object different from the this object | A method, which is not the declaring class initializer <clinit>, has a putstatic that refers to that field |
| B. Object modification | A possible runtime type of a variable corresponding to the field is mutable | (1) A possible runtime type of a variable corresponding to the field is mutable, or (2) A method may modify the state of the object referenced by the class variable |
| C. Variable accessibility | Field is non-private and non-final | Field is non-private and non-final |
| D. Object accessibility | A possible runtime type of a variable corresponding to the field is mutable | (1) A possible runtime type of a variable corresponding to the field is mutable, or (2) The field is non-private or upon a putstatic that refers to that field, a mutable object reachable from the class variable may be referenced from a non-local variable |
| E. Breakage of variable encapsulation | A possible runtime type of a variable corresponding to the field is mutable | (1) A possible runtime type of a variable corresponding to the field is mutable, or (2) A method may create non-local references to a mutable object reachable from the class variable |

For efficiency reasons, a sequence of sub-analyses are performed, each processing the whole code and extracting the information per each analyzed method, and later accumulating information for all the relevant fields. A sub-analysis is activated when the data computed by it is required for the first time; this information is reused during consecutive invocations of TestField routines.

The TestField routine for non-static fields does not re-analyze the field for each given implementation, as proposed in the high level algorithm. Instead, the routine computes a conservative classification of the field as mutable or immutable, which is valid for all the implementations of the class.

The TestField routine for static fields employs some complex sub-analysis, some of which require inter-procedural iterations.

B. The Mutability Analyzer Architecture

In the preferred embodiment of the present invention, the Mutability Analyzer implementation uses core libraries that were implemented as part of Toad, a post production environment that allows for a symbiosis of dynamic information about a running application, with static information gathered from the classes that comprise it. The Toad system can be downloaded from the IBM Alphaworks website (http://www.alphaworks.ibm.com/tech/toad). The Toad environment has been developed as an umbrella framework for a suite of core libraries and tools that monitor, understand, and optimize Java applications. Particularly, the CFParse library allows the user to read and write classfiles as well as edit them. The JAN library collects and manipulates static information about a Java component (e.g. application, applet, or servlet) by analyzing a set of classfiles, and effectively constructing the component's reference, hierarchy, and call graphs.

The Mutability Analyzer architecture consists of three layers as illustrated in FIG. 1:

Core libraries, each providing a particular abstraction of the component.

Utility modules, each performing an analysis that is supposed to be used in several contexts.

Mutability sub-analyses, each serving to test one or more of the TestField conditions.

1) Core Libraries

CFParse provides information that reflects the structure of a particular classfile. The data-flow analysis requires some higher-level abstraction of control flow, either at the intra-procedural level (intra-procedural control flow graph) or at the inter-procedural level (call graph). On top of these abstractions two additional core libraries are implemented, each being an engine for data-flow analysis:

Intra-procedural engine: used to iteratively compute the effect of an instruction on information associated with locations on the method frame (operand stack and local variables array).

Inter-procedural engine: used to compute the effect of a method on information associated with the variables that remain live after the method completes.

Note that during an inter-procedural analysis, the effect of a callee method that may reside outside the analysis scope ought to be estimated conservatively. In the preferred embodiment, the tool assumes that any virtual call (invokevirtual or invokeinterface) may have a potential target implementation outside the analysis scope. This is a major source of conservativeness for the analysis.

2) Utilities

In addition to the above core libraries, a set of utility analyses is also implemented:

Type analysis: used by both TestField routines as part of the tests for conditions B, D, E. For each analyzed method, the type analysis identifies for each instruction and for each frame location, the set of possible types of the location. The analysis distinguishes between the cases where the exact run-time type of the referenced object is known, and the cases where the run-time type is known up to assignment compatibility. The analysis also takes into account the scoping issues. In particular, if a field may be modified from outside the analysis scope, its type is conservatively assumed to be known up to assignment compatibility with the declared type. The analysis uses the intra-procedural engine.

Reachability analysis: used only by the version of the TestField routine for static fields to test conditions B, D, E as a basis for other sub-analyses. For example, in order to determine whether a class variable's encapsulation is broken, the reachability analysis is used to decide whether the object whose reference is being stored or returned may be reachable from a static field. Likewise, in order to determine whether a class variable's state is modified by a putfield instruction, the reachability analysis is used to decide whether the modified variable may be reachable from a static field. For each analyzed method, the reachability analysis identified for each instruction and for each frame location referring to a mutable object, the set of escaping objects and class variables from which that object becomes reachable. The set of escaping objects includes objects reachable from the method parameters and the returned object. Note that reachability relationships of immutable objects are ignored. Mutability is determined based on a list of immutable types which is a parameter to the analysis. The analysis uses both the inter- and intra-procedural engines.

3) Sub-analyses

The next layer of the Mutability Analyzer (as described in FIG. 1) is the set of sub-analyses:

Value modification: used by both TestField routines to test for condition A. For each analyzed method, the value modification analysis identifies the set of fields whose corresponding instance variables and class variables may be set within that method. Three cases are distinguished:

The analyzed method is a class initializer (<clinit>): A field which is affected by a putstatic instruction is added to the set of modified fields, unless the field is declared in the class currently under initialization. A field which is affected by a put field instruction is always added to the set.

The analyzed method is an instance constructor (<init>): A field which is affected by a putstatic instruction is always added to the set of modified fields. A field which is affected by a putfield instruction is added unless it can be proven that the corresponding variable belongs to the object currently under construction.

Otherwise: For every putfield/putstatic instruction, the field affected by the instruction is added to the set of modified fields.

The analysis uses the intra-procedural engine.

Object modification: used by the static fields version of the TestField routine to test for condition B.

For each analyzed method, the state modification analysis identifies the set of reference-type static fields and method parameters whose referenced object's state may be modified by this method. For each putfield or xastore instruction, the analysis consults the reachability analysis to determine whether the object being stored into is reachable from a static field or a method parameter. Note that the analysis makes no exception for initialization methods (<init> or <clinit>); e.g., if a static field is first assigned a reference to an object during the corresponding class initialization method, and the state of this object is subsequently modified, the analysis would identify this as state modification.

The analysis uses the inter- and intra-procedural engines and the type and reachability analyses.

Variable Accessibility: used by both versions of the TestField routine to test for condition C.

For each analyzed field, the variable accessibility analysis identifies whether the value of the variable may be modified from outside the analysis scope. The current implementation is based only on the access restrictions defined by the language. Thus, a field which is non-private and non-final is identified as accessible. In other embodiments, this analysis can be improved by taking into account runtime access restrictions and additional scoping information.

Object Accessibility and Breakage of Encapsulation: used by the static fields version of the TestField routine to test for conditions D and E.

For each analyzed method, the encapsulation analysis identifies the set of reference-type static fields and method parameters which may not be encapsulated upon the completion of the method. The definitions of encapsulation regard a variable as encapsulated unless there exists a mutable object reachable from the variable, which is accessible from outside the analysis scope. The implementation in the preferred embodiment is more conservative and regards creation of any non-local reference to a mutable object reachable from the variable as breakage of encapsulation of this variable. This is due to the difficulty in tracking non-local references.

A non-local store operation (putfield/putstatic/aastore)or a return causes breakage of encapsulation of any variable that references the stored object. Assignment by a putfield or putstatic of a non-encapsulated object breaks the encapsulation of the variable into which the reference is stored.

In the preferred embodiment, the tests of conditions D and E are joined in a single analysis since the two processes require much of the same information.

The analysis uses the inter- and intra-procedural engines and the type and reachability analyses.

C. Results

The results of the tool according to the preferred embodiment were evaluated by comparing them to the results derived by an access-based algorithm described below. Both algorithms start with the class java.lang.String being classified as immutable. The access-based algorithm does not require any processing of method bodies and may be implemented by using the core Java reflection mechanism. The TestComponent routine remains the same; the tests in Testfield for conditions A–E are as follows:

(A) Value modification: field is non-final (B) Object modification: field's declared type is an array type, or a non-final class, or a mutable class (C) Variable accessibility: field is non-private or non-final (D) Object accessibility: field's declared type is an array type, or a non-final class, or a mutable class (E) Breakage of variable encapsulation: field's declared type is an array type, or a non-final class, or a mutable class The runtime library rt.jar from the Java 2 JDK release 1.2 is used to illustrate the benefits of this approach. This library was chosen since rt.jar is fairly large (>10.2 Mb), and represents a reasonably diverse set of coding styles.

Figure 2:
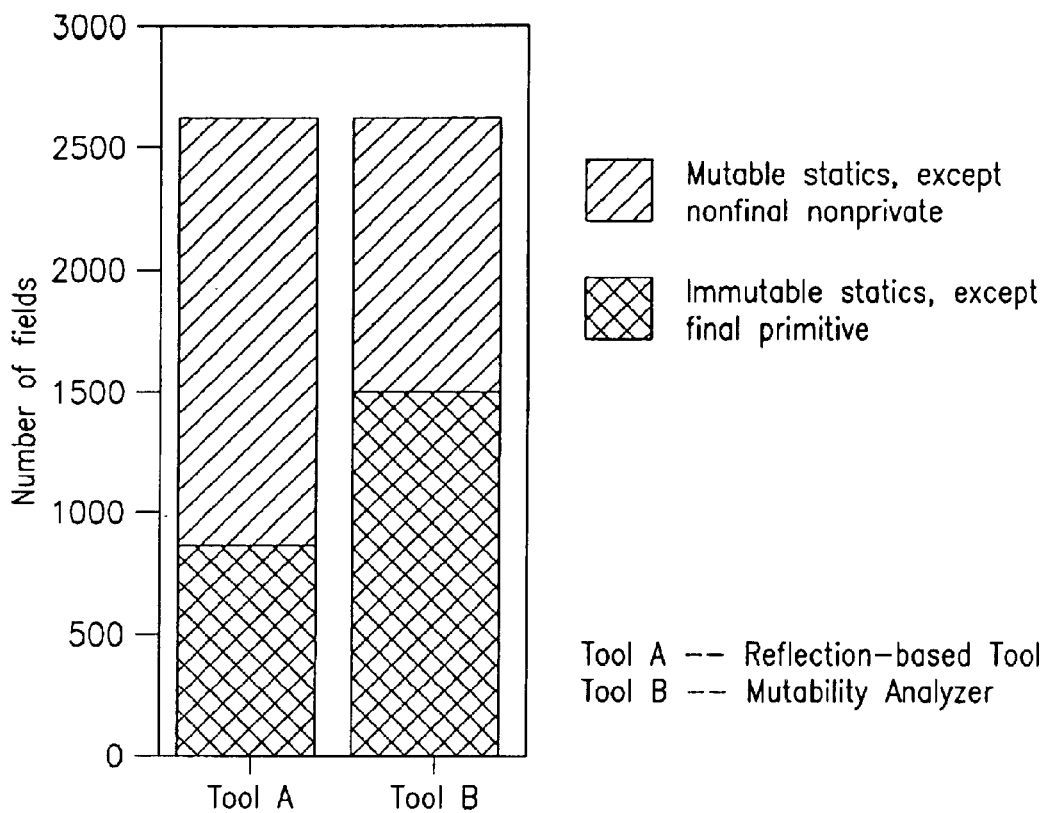
FIG. 2 is a graph of the distribution of mutable and immutable static fields comparing the results for an access-based algorithm to the results form the Mutability Analyzer tool according to the preferred embodiment.

FIG. 2 gives the distribution of mutable and immutable static fields for the two algorithms.

The graph shows growth in the number of fields identified as immutable. Note that identification of final primitive static fields as immutable is simple and they are treated in the same way by any tool which ignores violation of Java access rules from native code or via reflection. Non-final non-private static fields would be identified as mutable in every analysis which does not take into account runtime accessibility. Therefore, the improvement comes from reducing the number of other mutable static fields. In other embodiments, the tool can be enhanced so that the sizes of both categories of mutable static fields will be further reduced.

In addition to the classification of fields as mutable or immutable, the Mutability Analyzer provides the information on mutability causes, such as the location of the potentially modifying code. This information can be used to modify the user code so as to make certain fields immutable. Table 2 provides the number of fields reported for each mutability cause in rt.jar.

TABLE 2

| Cause | Number of fields |
| --- | --- |
| Non-final non-private field | 541 |
| Non-private mutable-type field | 703 |
| Field value modified | 484 |
| Field state is modified | 855 |
| Field encapsulation is broken | 1280 |

One of the observations from Table 2 is the large number of fields for which state modification and encapsulation breakage are reported, and the high correlation between the presence of these two causes. This is related to the very conservative approach used in processing virtual methods. Type analysis and package access restrictions may be applied to reduce this over-conservativeness. These improvements are expected to greatly reduce the number of fields for which state modification and encapsulation breakage are reported. Most of the fields reported by the tool as directly modifiable or accessible (non-final non-private fields, non-private mutable-type field) are in fact default-scope fields in packages with restricted access. The number of reports of these causes are expected to drop almost to zero when the runtime access restrictions are taken into account.

Experience shows that in existing code most of the static fields fall into one of the two categories:

compile-time constants (i.e., final primitive or final java.iang.String)

mutable fields (ignoring run-time access restrictions, so that non-private non-final fields are considered mutable There are relatively few immutable fields that are not compile-time constants. The tool was run on a large internal IBM framework (~2.4 Mb together with runtime libraries, 4634 classes), containing multiple libraries, applets, and servlets. This framework contains 3553 static fields, of which 2324 are compile-time constants. Of the remaining 1229 fields, 992 fields are mutable either because they are non-final and non-private or because their value-state is modified. Of the remaining 237 fields, more than two thirds (160 fields) were identified as immutable by our tool.

Developers can use the identified cause of mutability produced by the Mutability Analyzer to modify the code so as to avoid the potentially hazardous sharing of global state. This feature is unique to this tool.

Figure 3:
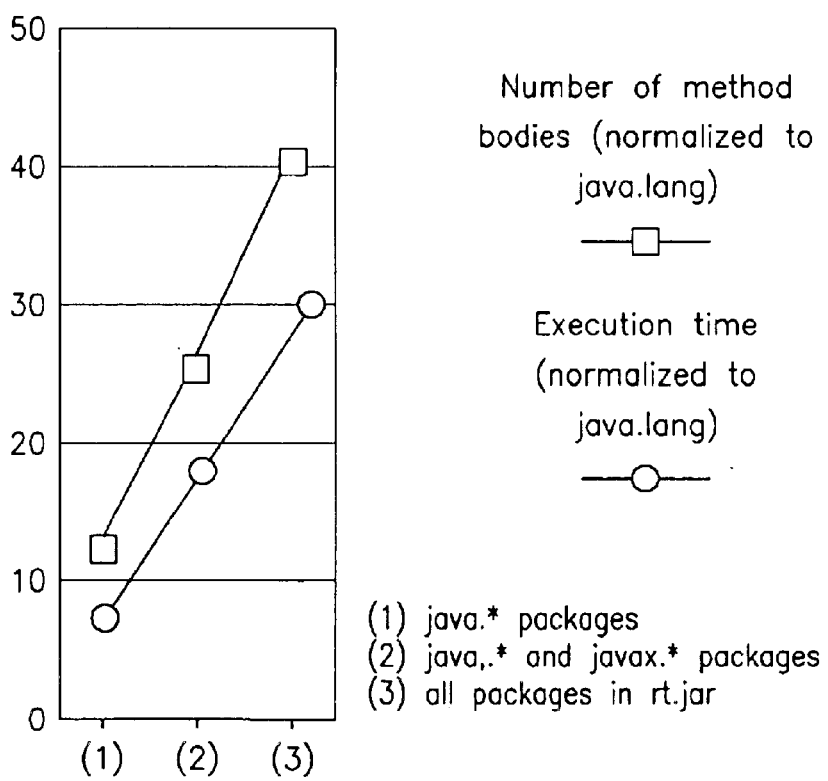
FIG. 3 is a graph of the analysis times and analyzed library sizes for different parts of rt.jar of the analysis of the Mutability Analyzer according to the preferred embodiment of the present invention.

One of the primary concerns during the implementation of the tool was its scalability. Of particular concern were the sub-analyses which require inter-procedural iterations: reachability analysis, object accessibility and breakage of encapsulation analysis, and state modification analysis. In practice, the tool proved to be fairly scalable. The tool was run on a Pentium III 500 with 128 Mb RAM, using the Sun JVM 1.3.Orc1-T. The analysis time for the full rt.jar was approximately 20 minutes. Although the analysis requires interprocedural processing, in practice it is inherently efficient and almost linear in the problem size. This can be seen from FIG. 3 which shows the results of the analysis on different parts of rt.jar.

IV. Conclusion

As previously emphasized, the analysis according to the preferred embodiment of the present invention is designed to primarily support open-world analysis. In the general case, this entails that all non-private fields and methods are considered as accessible from outside the analysis scope. In practice, however, there are certain circumstances in which accessibility of fields and methods may become more restrictive. For example, the component may be perceived as a Java application that is expected to run as a single component in a JVM. In that case, no user-defined method (in contrast to JDK methods) should be considered as being accessible from outside the analyzed component, other than the single 'main' method from which the application starts running. Such information would significantly reduce the size of the component's call-graph. Consequently, the amount of mutability causes reported by the Mutability Analyzer would be substantially reduced, and more fields would be identified as immutable. In general, additional information on those methods from which the component can start its execution would reduce the set of accessible methods. Such information can be supplied to the Mutability Analyzer as meta data.

The run-time resolution process that determines the actual instance variable or class variable that gets accessed is subject to runtime access restrictions. It is the SecurityManager that is responsible for restricting the run-time accessibility. A particular runtime access restriction is derived from package sealing, i.e. a certain characterization of a package telling that all the classes in it must come from the same JAR file. Similarly to the case of the meta-data discussed above, information on sealed packages would restrict the accessibility abstraction of fields and methods. It is expected that most of the 541 non-private non-final rt.jar fields that are currently determined as mutable, would be determined as inaccessible from outside the component, since all but two packages of rt.jar are considered as being sealed. In another embodiment of the Mutability Analyzer, a generic module would be implemented which would use these two kinds of accessibility information.

The Mutability Analyzer according to the preferred embodiment of the present invention is inherently conservative. A major source for over-conservativeness in the current version is derived from the fact that the analysis assumes that each virtual invocation may be resolved to a method that is defined outside the analyzed component. This implies that arguments passed at such invocations are considered to be potentially modified. In another embodiment, the component call-graph can be optimized in the sense of identifying certain virtual call sites for which all possible target implementations reside within the analysis scope. In addition, information on accessibility restrictions, as discussed above, may be further used for better call resolution. Sealing information can be used to identify sealed calls, i.e. calls whose potenbal targets are confined to a package and can be completely determined at analysis time. It has been shown that in about half of the sealed packages in rt.jar, 5–60% of the virtual calls to non-final methods are identified as sealed.

Although the preferred embodiment of the present invention has been introduced in the context of discovering mutability for the benefit of improved integrity, security, and scalability, there are other uses of the mutability information that leverage the fact that the state of certain fields/objects are invariant over time. Because of this, optimizations are possible to improve the performance of a running system and testing becomes more tractable. Below are listed some potential uses and benefits of the present invention:

Keeping Constants in Read-Only Memory (ROM). To improve the scalability and performance of the Java runtime, it is often desirable to keep objects that are known to be constants in ROM. This is desirable for all flavors of Java—high end servers, where it is desirable to start JVMs quickly in order to run a transaction and exit; embedded systems, where RAM is a scarce resource; and desktops, where it is desirable to be able to quickly start a Java application with minimal overhead. The net effect is that objects are placed in read-only memory, saving space in the heap, and avoiding extra work to heap garbage collection.

Distributed Shared Memory (DSM). An important factor in the efficiency of DSM is the proper distribution of objects between the processors. Identifying immutable objects allows the creation of duplicates on each of the processors in the DSM cluster. This eliminates the need to transport the objects from one processor to another at considerable cost. In addition, information on immutable objects can be exploited to avoid the overhead of costly coherency and synchronization in multithreaded and distributed environments.

Concurrency. Execution of concurrent programs on Symmetrical Multi-Processor (SMP) or Non-Uniform Memory Access (NUMA) systems introduces safety and liveness concerns. Designing for concurrency requires avoiding unsynchronized changes to shared state. Such synchronization introduces overhead costs. This overhead can be avoided for objects known to be immutable. An interesting example of a specific use of immutable objects identification is the generational garbage collector of Doligez and G. Gonthier, Portable, unobtrusive garbage collection for multiprocessor systems, in Conference Record of the $21^{st}$ Annual ACM Symposium on Principles of Programming Languages, ACM SIGPLAN Notices. ACM PRESS, pp. 113–123, 1994, and Doligez and X. Leroy, A concurrent generational garbage collector for a multi-threaded implementation of ML, Conference Record of the $20^{th}$ Annual ACM Symposium on Principles of Programming Languages, ACM SIGPLAN Notices. ACM PRESS, pp. 113–123, 1993. This highly efficient garbage collector allocates only immutable objects in a local young generation subheap. The key idea is that immutable objects can be replicated without affecting program semantics. The algorithm in the preferred embodiment of the present invention can be used to identify immutable objects in Java, and therefore motivate the use of such a generational garbage collector.

Component specification. Mutability information is useful in the characterization of a component's behavior. This characterization enhances the component's interface specification, and is useful in facilitating component reusability. The traditional pre- and post-conditions specifying properties on arguments are augmented through information introduced by inference from the mutability of the component's global state.

Testing coverage. Software testing uses coverage criteria to determine effectiveness of a test set. Data-flow testing criteria are usually based on "def-use" information, as shown in A. S. Parrish and S. H. Zweben, On the Relationships Among the All-Uses, All-DU-Paths, and All-Edges Testing Criteria, IEEE Transactions on Software Engineering, vol. 21, No. 12, December 1995. There are two major problems in the traditional def-use criteria. One appears in the context of real-life applications, where the size of the test sets becomes far too large as a result of allaying information. The other is in testing libraries where the effect of methods outside the analysis scope must be considered. Mutability information can be exploited to define criterion which is weaker than those known in the literature, but is more scalable and applicable to real-world applications. Also, in contrast to the existing criteria, the proposed mutability criterion would cover locations where a variable becomes exposed to external modification in addition to locations where the variable is found to be internally modified.

Value range. Test case values are generally formed using default boundary type values. The domain size in real applications is huge. In practice, this limits the applicability of the test model. Identifying constant objects significantly reduces the domain size problem, thus facilitating effective use of the model.

Definitions for mutability in Java have never been specifically formulated. The preferred embodiment of the present invention presented definitions that can serve as the basis for further research work in this area, and illustrate an innovative approach for static analysis in order to automatically detect mutable and immutable variables, fields, objects, and classes. One of the major contributions made by the present invention is in coping with an open-world analysis, thus being able to accept any Java components the analysis scope. The results of the Mutability Analyzer tool demonstrates the strength of the approach, and reinforces the integrity of the definitions. Despite the fact that an open-world analysis has been employed, the Mutability Analyzer successfully categorizes class variables as well as instance variables and classes for the Java runtime.

One of the core design decisions that drove the implementation of the preferred embodiment was to use basic core libraries such as CFParse and JAN, and introduce general-purpose engines for intra-procedural and inter-procedural analyses. The code is designed to be scalable and fit into a multi-level static analysis framework, so that utilities and sub-analyses can be used and extended to deal with properties other than mutability characterization.

Static analysis is in some cases limited. Therefore, for properties that the analysis will not be able to detect statically, smart annotations will be facilitated in other embodiments so as to detect those cases at run time. This can be done by using the CFParse core library to parse, edit and annotate classfiles.

In addition, other embodiments of the present invention will direct the analysis expansion, such as interval immutability analysis to determine immutability of variables at certain intervals, e.g., during the invocation of a specific method, and modular immutability analysis which would allow plugging together the results of mutability analysis of sub-components to obtain analysis of the full component. The definition of immutability starting from a certain initialization point may be enhanced so as to cover lazy initialization, i.e., cases where a variable is set only once but not necessarily during the class or instance initialization.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of detecting mutability of variables, objects, fields, and classes in a program component, said component being written in an object-oriented programming language, comprising the steps of:

determining whether any variable in the program component could undergo a state modification of a first type, said first type state modification being made by at least one method that is within the program component; and performing encapsulation analysis to determine whether any variable in the program component could undergo a state modification of a second type, said second type state modification being made by at least one method that is not within the program component, wherein a variable is mutable if its state ever changes after said variable is initialized, the state of said variable being its value together with a state of any referenced object, wherein an object is mutable if its state ever changes after said object is initialized, said state of said object being a set of states of all associated variables, a field is mutable if any variable corresponding to said field is mutable, and a class is mutable if any instance fields implemented by said class are mutable.

2. The method as recited in claim 1, the first type state modification determination step comprising the steps of:

detecting possible first type state modification of a value held in said each variable; and detecting possible first type state modification of a state of any object referenced by said each variable.

3. The method as recited in claim 1, the encapsulation analysis step comprising the steps of:

detecting possible second type state modification of a value held in said each variable;

detecting possible second type state modification of a state of any object referenced by said each variable, said possible second type state modification of a state of any object occurring at a point of initialization; and detecting possible breakage of variable encapsulation, wherein a variable is encapsulated if all references to objects reachable from it are defined within the program component, and variable encapsulation is broken if a method within the program component causes a mutable object reachable from the variable to become accessible to at least one method that is not within the program component.

4. The method as recited in claim 1, wherein the method is implemented in an object oriented environment, said any instance fields being non-static fields, said variables being class variables or instance variables, each of said class variables being initialized upon completion of its corresponding <clinit> method, and each of said instance variables being initialized upon completion of its corresponding <init> method.

5. The method as recited in claim 1, further comprising the step of: identifying isolation faults due to detected mutable global variables or objects.

6. The method as recited in claim 1, further comprising the step of: identifying fields and objects that can be determined to be constants because said identified fields and objects are not in the set of detected mutable fields and objects.

7. A method of detecting mutability of classes in a program component, said component being written in an object-oriented programming language, comprising the steps of:

obtaining a set of classes, each of said classes being classified as one of mutable, immutable, and undecided;

testing each undecided class, said test being comprised of the sub-steps of:

testing each field in said undecided class being tested, said test being comprised of the sub-substeps of:
  determining whether any variable corresponding to said each field could undergo a state modification of first type, said first type state modification being made by at least one method that is within said component; and
  performing encapsulation analysis to determine whether any variable corresponding to said each field could undergo a state modification of a second type, said second type state modification being made by at least one method that is not within said component;
classifying said each field as immutable if no possible first type or second type state modifications are found;
classifying said each field as undecided if there is insufficient class mutability information; and
classifying said each field as mutable otherwise;
re-classifying said undecided class as mutable if any fields in said undecided class are mutable;
re-classifying said undecided class as immutable if all fields in said undecided class are immutable;
repeating said testing each undecided class step until a number of undecided classes after a repetition of said testing step is identical to a number of undecided classes before the repetition of said testing step; and
re-classifying remaining undecided classes as mutable classes.

8. A method of detecting mutability of classes in a program component, said component being written in an object-oriented programming language, comprising the steps of:
obtaining a set of classes, each of said classes being classified as one of mutable, immutable, and undecided; testing each undecided class, said test being comprised of the sub-steps of:
  testing each instance field in said undecided class being tested, said test being comprised of the sub-sub-steps of:
    determining whether any variable corresponding to said each instance field could undergo a state modification of first type, said first type state modification being made by at least one method that is within said component; and
    performing encapsulation analysis to determine whether any variable corresponding to said each instance field could undergo a state modification of a second type, said second type state modification being made by at least one
  method that is not within said component;
  classifying said each instance field as immutable if no possible first type or second type state modifications are found;
  classifying said each instance field as undecided if there is insufficient class mutability information; and
  classifying said each instance field as mutable otherwise;
re-classifying said undecided class as mutable if any instance fields in said undecided class are mutable;
re-classifying said undecided class as immutable if all instance fields in said undecided class are immutable;
repeating said testing each undecided class step until a number of undecided classes after a repetition of said testing step is identical to a number of undecided classes before the repetition of said testing step; and
re-classifying remaining undecided classes as mutable classes.

9. The method as recited in claim 8, the first type state modification determination sub-sub-step comprising the steps of:
detecting possible first type state modification of a value held in said each variable; and
detecting possible first type state modification of a state of any object referenced by said each variable,
wherein a state of an object is modified if it can change after said object is initialized, and the state of an object is a set of states of all associated variables, and
a variable is mutable if its state ever changes after said variable is initialized, the state of said variable being its value together with a state of any referenced object.

10. The method as recited in claim 8, the performing encapsulation analysis sub-sub-step comprising the steps of:
detecting possible second type modification of a value of said each variable;
detecting possible second type modification of a state of any object referenced by said each variable, said possible second type state modification of a state of any object occurring at a point of initialization; and
detecting possible breakage of variable encapsulation,
wherein a state of an object is modified if it can change after said object is initialized, and the state of an object is a set of states of all associated variables,
a variable is mutable if its state ever changes after said variable is initialized, the state of said variable being its value together with a state of any referenced object,
a variable is encapsulated if all references to objects reachable from it are defined within said component, and
variable encapsulation is broken if a method within the program component causes a mutable object reachable from a variable to become accessible to at least one method that is not within said component.

11. The method as recited in claim 8, wherein the method is implemented in an object oriented environment, said each variable corresponding to said each instance field being a non-static variable, and each non-static variable being initialized upon completion of its corresponding <init> method.

12. The method as recited in claim 8, further comprising the steps of:
identifying an object as mutable if it is an instance of a mutable class;
identifying an object as immutable if it is an instance of an immutable class; and
identifying fields and objects that can be determined to be constants because said identified fields and objects are not in a set of detected mutable fields and objects.

13. The method as recited in claim 8, further comprising the step of: testing mutability of each undecided class field in each class.

14. The method as recited in claim 13, further comprising the step of: identifying isolation faults due to detected mutable class fields.

15. The method as recited in claim 13, the step of testing mutability of each undecided class field in each class comprising the sub-steps of:
determining whether any variable corresponding to said each undecided class field could undergo a first type state modification; and performing encapsulation analysis to determine whether any variable corresponding to said each undecided class field could undergo a second type state modification.

16. The method as recited in claim 15, wherein the determining whether any variable corresponding to said each undecided class field could undergo a first type state modification sub-step comprises the steps of:
   detecting possible first type state modification of a value held in said each variable; and
   detecting possible first type state modification of a state of any object referenced by said each variable,
   wherein a state of an object is modified if it can change after said object is initialized, and the state of an object is a set of states of all associated variables, and
   a variable is mutable if its state ever changes after said variable is initialized, the state of said variable being its value together with a state of any referenced object.

17. The method as recited in claim 15, wherein the performing encapsulation analysis to determine whether any variable corresponding to said each undecided class field could undergo a second type state modification sub-step comprises the steps of:
   detecting possible second type state modification of a value of said each variable;
   detecting possible second type state modification of a state of any object referenced by said each variable, said possible second type state modification of a state of any object occurring at a point of initialization; and
   detecting possible breakage of variable encapsulation,
   wherein a state of an object is modified if it can change after said object is initialized, and the state of an object is a set of states of all associated variable,
   a variable is mutable if its state ever changes after said variable is initialized, the state of said variable being its value together with a state of any referenced object,
   a variable is encapsulated if all references to objects reachable from it are defined within said component, and
   variable encapsulation is broken if a method within the program component causes a mutable object reachable from a variable to become accessible to at least one method that is not within said component.

18. The method as recited in claim 13, wherein the method is implemented in an object oriented environment, said variables corresponding to said each undecided class field being static variables, and each static variables being initialized upon completion of its corresponding <clinit> method.

19. A method of detecting mutability of classes and class variables in a program component, said component being written in an object-oriented programming language, comprising the steps of:
   obtaining a set of classes, each of said classes being classified as one of mutable, immutable, and undecided;
   testing each undecided class, said test being comprised of the sub-steps of:
      testing mutability of each instance field in said undecided class being tested;
      classifying an instance field as immutable if no possible state or encapsulation analysis modifications are found;
      classifying an instance field as undecided if there is insufficient class mutability information; and
      classifying an instance field as mutable otherwise;
      re-classifying an undecided class as mutable if any instance fields in said undecided class are mutable;
      re-classifying said undecided class as immutable if all instance fields in said undecided class are immutable;
   repeating said testing each undecided class step until a number of undecided classes after a repetition of said testing step is identical to a number of undecided classes before the repetition of said testing step;
   re-classifying remaining undecided classes as mutable classes; and
   testing mutability of each class field in each class.

20. The method as recited in claim 19, wherein testing mutability of a field, whether said field is an instance field or a class field, is comprised of the sub-steps of:
   determining whether any variable corresponding to said field being tested could undergo a state modification of a first type, said first type state modification being made by at least one method that is within said program component; and
   performing encapsulation analysis to determine whether any variable corresponding to said field being tested could undergo a state modification of a second type, said second type state modification being made by at least one method that is not within said program component;
   classifying said field being tested as immutable if no possible state modifications or breakages of encapsulation are found;
   classifying said field being tested as undecided if there is insufficient class mutability information; and
   classifying said field being tested as mutable otherwise.

21. The method as recited in claim 20, wherein the first type state modification determination sub-step comprises the steps of:
   detecting possible first type state modification of a value held in said each variable; and
   detecting possible first type state modification of a state of any object referenced by said each variable,
   wherein a state of an object is modified if it can change after said object is initialized, and the state of an object is a set of states of all associated variables, and
   a variable is mutable if its state ever changes after said variable is initialized, the state of said variable being its value together with a state of any referenced object.

22. The method as recited in claim 20, wherein the performing encapsulation analysis sub-step comprises the steps of:
   detecting possible second type state modification of a value of said each variable;
   detecting possible second type state modification of a state of any object referenced by said each variable, said possible second type state modification of a state of any object occurring at a point of initialization; and
   detecting possible breakage of variable encapsulation,
   wherein a state of an object is modified if it can change after said object is initialized, and the state of an object is a set of states of all associated variable,
   a variable is mutable if its state ever changes after said variable is initialized, the state of said variable being its value together with a state of any referenced object,
   a variable is encapsulated if all references to objects reachable from it are defined within said components, and variable encapsulation is broken if a method within the program component causes a mutable object reachable from a variable to become accessible to at least one method that is not within said component.

23. The method as recited in claim 19, wherein the method is implemented in an object oriented environment, said instance fields being non-static fields, an instance variable being initialized upon completion of its corresponding <init> method, and said class fields being static fields, a class variable being initialized upon completion of its corresponding <clinit> method.

24. The method as recited in claim 19, further comprising the steps of:
   identifying an object as mutable if it is an instance of a mutable class;
   identifying an object as immutable if it is an instance of an immutable class; and
   identifying fields and objects that can be determined to be constants because said identified fields and objects are not in a set of detected mutable fields and objects.

25. The method as recited in claim 19, further comprising the step of:
   identifying isolation faults due to detected mutable class fields.

26. A device for detecting mutability of variables, objects, fields, and classes in a program component, said component being written in an object-oriented programming language, the device comprising, memory for holding
   a layer of at least one core library and at least one data-flow analysis engine, for providing a particular abstraction of the program component;
   a layer of at least one utility module, for using the results of the at least one data analysis engine to generate basic results; and
   a layer of at least one mutability sub-analysis module, for generating final results,
   wherein a variable is mutable if its state ever changes after said variable is initialized, the state of a variable being its value together with a state of any referenced object,
   an object is mutable if its state ever changes after said object is initialized, the state of an object being a set of states of all associated variables,
   a field is mutable if any variable corresponding to said field is mutable, and
   a class is mutable if any instance fields implemented by said class are mutable.

27. The device as recited in claim 26, wherein the layer of at least one core library and at least one data analysis engine comprising:
   a library for collecting and manipulating static information about the program component by analyzing a set of class files, and for effectively constructing the program component's reference, hierarchy, and call graphs.

28. The device as recited in claim 26, wherein the layer of at least one core library and at least one data analysis engine comprising: a library for allowing a user to read class files.

29. The device as recited in claim 26, wherein the layer of at least one core library and at least one data analysis engine comprising: an intra-procedural data analysis engine for iteratively computing an effect of an instruction on information associated with locations on a method fame, said method frame being an operand stack and a local variables array.

30. The device as recited in claim 26, wherein the layer of at least one core library and at least one data analysis engine comprising: an inter-procedural data analysis engine for computing the effect of a method on information associated with variables that still exist upon completion of this method.

31. The device as recited in claim 26, wherein the layer of at least one utility module comprising: a type analysis utility module for identifying a set of possible types for each instruction and each frame location in each method.

32. The device as recited in claim 26, wherein the layer of at least one utility module comprising: a reachability analysis utility module for identifying, for each method, a set of escaping objects and class variables from which a mutable object is reachable for each instruction and each frame location referring to said mutable object.

33. The device as recited in claim 26, wherein the layer of at least one mutability sub-analysis module comprising: a value modification mutability sub-analysis module for identifying, for each method, a set of fields whose corresponding instance and class variables may be set within said each method.

34. The device as recited in claim 26, wherein the layer of at least one mutability sub-analysis module comprising: an object modification mutability sub-analysis module for identifying, for each method, a set of reference-type fields and method parameters, said set of reference-type fields and method parameters referencing an object, a state of said object being modified by said each method.

35. The device as recited in claim 26, wherein the layer of at least one mutability sub-analysis module comprising: a variable accessibility mutability sub-analysis module for identifying, for each variable, whether its value may be modified directly by at least one method that is not within the program component.

36. The device as recited in claim 26, wherein the layer of at least one mutability sub-analysis module comprising: an object accessibility mutability sub-analysis module for detecting possible accessibility of a state of each object, by determining if each variable associated with said object is encapsulated,
   wherein a variable is encapsulated if all references to objects reachable from it are defined within the program component, and
   said accessibility is made by at least one method that is not within the program component.

37. The device as recited in claim 26, wherein the layer of at least one mutability sub-analysis module comprising: a breakage of encapsulation mutability sub-analysis module for detecting a possible breakage of encapsulation,
   wherein a variable is encapsulated if all references to mutable objects reachable from it are defined within the program components, and
   variable encapsulation is broken if a method within the program component causes a mutable object reachable from the variable to become accessible to at least one method that is not within the program component.

38. A computer system for detecting mutability of variables, objects, fields, and classes in a program component, said component being written in an object-oriented programming language, the computer system comprising:
   at least one computer-readable memory including:
      code that determines whether any variable in the program component could undergo a state modification of a first type, said first type state modification being made by at least one method that is within the program component; and code that performs encapsulation analysis to determine whether any variable in the program component could undergo a state modification of a second type, said second type state modification being made by at least one method that is not within the program component, wherein a variable is mutable if its state ever changes after said variable is initialized, the state of said variable being its value together with a state of any referenced object, an object is mutable if its state ever changes after said object is initialized, the state of said object being a set of states of all associated variables, a field is mutable if any variable corresponding to said field is mutable, and a class is mutable if any instance fields implemented by said class are mutable.

39. The computer system as recited in claim 38, wherein the code that determines whether any variable could undergo the first type state modification comprises:

code that detects possible first type state modification of a value held in said each variable; and code that detects possible first type state modification of a state of any object referenced by said each variable.

40. The computer system as recited in claim 38, wherein the code that performs encapsulation analysis step comprises:

code that detects possible second type state modification of a value held in said each variable;

code that detects possible second type state modification of a state of any object referenced by said each variable, said possible second type state modification of a state of any object occurring at a point of initialization; and code that detects possible breakage of variable encapsulation, wherein a variable is encapsulated if all references to objects reachable from it are defined within the program component, and variable encapsulation is broken if a method within the program component causes a mutable object reachable from the variable to become accessible to at least one method that is not within the program component.

41. The computer system as recited in claim 38, wherein the program component is implemented in an object oriented environment, said any instance fields being non-static fields, said variables being class variables or instance variables, each of said class variables being initialized upon completion of its corresponding <clinit> method, and each of said instance variables being initialized upon completion of its corresponding <init> method.

42. The computer system as recited in claim 38, wherein the at least one computer-readable memory further includes: code that identifies isolation faults due to detected mutable global variables or objects.

43. The computer system as recited in claim 38, wherein the at least one computer-readable memory further includes: code that identifies fields and objects that can be determined to be constants because said identified fields and objects are not in the set of detected mutable fields and objects.

44. A computer system for detecting mutability of variables, objects, fields, and classes in a program component, said component being written in an object-oriented programming language, the computer system comprising:

at least one computer-readable memory including:

code that obtains a set of classes, each of said classes being classified as one of mutable, immutable, and undecided;

code that tests each undecided class,'said test being comprised of:

code that tests each field in said undecided class being tested, said field testing code being comprised of:

code that determines whether any variable corresponding to said each field could undergo a state modification of a first type, said first type state modification being made by at least one method that is within the program component; and code that performs encapsulation analysis to determine whether any variable corresponding to said each field could undergo a state modification of a second type, said second type state modification being made by at least one method that is not within the program component;

code that classifies said each field as immutable if no possible state modifications or breakages of encapsulation are found;

code that classifies said each field as mutable if possible state modifications or breakages of encapsulation are found; and code that classifies said each field as undecided if there is insufficient class mutability information;

code that re-classifies said undecided class as mutable if any fields in said undecided class are mutable;

code that re-classifies said undecided class as immutable if all fields in said undecided class are immutable;

code that repeats said testing each undecided class code until a number of undecided classes after a repetition of said testing code is identical to a number of undecided classes before the repetition of said testing code; and code that re-classifies remaining undecided classes as mutable classes.

45. A computer system for detecting mutability of variables, objects, fields, and classes in a program component, said component being written in an object-oriented programming language, the computer system comprising:

at least one computer-readable memory including:

code that obtains a set of classes, each of said classes being classified as one of mutable, immutable, and undecided;

code that tests each undecided class, said test being comprised of:

code that tests each instance field in said undecided class being tested, said instance field testing code being comprised of:

code that determines whether any variable corresponding to said each instance field could undergo a state modification of a first type, said first type state modification being made by at least one method that is within the program component; and code that performs encapsulation analysis to determine whether any variable corresponding to said each instance field could undergo a state modification of a second type, said second type state modification being made by at least one method that is not within the program component;

code that classifies said each instance field as immutable if no possible state modifications or breakages of encapsulation are found;

code that classifies said each instance field as mutable if possible state modifications or breakages of encapsulation are found; and code that classifies said each instance field as undecided if there is insufficient class mutability information;

code that re-classifies said undecided class as mutable if any instance fields in said undecided class are mutable;
code that re-classifies said undecided class as immutable if all instance fields in said undecided class are immutable;
code that repeats said testing each undecided class code until a number of undecided classes after a repetition of said testing code is identical to a number of undecided classes before the repetition of said testing code; and
code that re-classifies remaining undecided classes as mutable classes.

46. The computer system as recited in claim 45, wherein the code that determines whether any variable could undergo a first type state modification comprises:
code that detects possible first type state modification of a value held in said each variable; and
code that detects possible first type state modification of a state of any object referenced by said each variable,
wherein a state of an object is modified if it can change after said object is initialized, and the state of an object is a set of states of all associated variables, and
a variable is mutable if its state ever changes after said variable is initialized, the state of said variable being its value together with a state of any referenced object.

47. The computer system as recited in claim 45, wherein the code that performs encapsulation analysis comprises:
code that detects possible second type modification of a value of said each variable;
code that detects possible second type modification of a state of any object referenced by said each variable, said possible second type state modification of a state of any object occurring at a point of initialization; and
code that detects possible breakage of variable encapsulation,
wherein a state of an object is modified if it can change after said object is initialized, and the state of an object is a set of states of all associated variables,
a variable is mutable if its state ever changes after said variable is initialized, the state of said variable being its value together with a state of any referenced object,
a variable is encapsulated if all references to objects reachable from it are defined within said component, and
variable encapsulation is broken if a method within the program component causes a mutable object reachable from a variable to become accessible to at least one method that is not within said component.

48. The computer system as recited in claim 45, wherein the program component is implemented in an object oriented environment, said each variable corresponding to said each instance field being a non-static variable, and each non-static variable being initialized upon completion of its corresponding <init> method.

49. The computer system as recited in claim 45, wherein the at least one computer-readable memory further includes:
code that identifies an object as mutable if it is an instance of a mutable class;
code that identifies an object as immutable if it is an instance of an immutable class; and
code that identifies fields and objects that can be determined to be constants because said identified fields and objects are not in a set of detected mutable fields and objects.

50. The computer system as recited in claim 45, wherein the at least one computer-readable memory further includes: code that tests mutability of each undecided class field in each class.

51. The computer system as recited in claim 50, wherein the at least one computer-readable memory further includes: code that identifies isolation faults due to detected mutable class fields.

52. The computer system as recited in claim 50, wherein the code that tests mutability of each undecided class field in each class comprises:
code, that determines whether any variable corresponding to said each undecided class field could undergo a first type state modification; and
code that performs encapsulation analysis to determine whether any variable corresponding to said each undecided class field could undergo a second type state modification.

53. A computer system for detecting mutability of classes and class variables in a program component, said component being written in an object-oriented programing language, comprising:
at least one computer-readable memory including:
code that obtains a set of classes, each of said classes being classified as one of mutable, immutable, and undecided;
code that tests each undecided class, said test being comprised of:
code that tests each instance field in said undecided class being tested, said instance field testing code being comprised of:
code that determines whether any variable corresponding to said each instance field could undergo a state modification of a first type, said first type state modification being made by at least one method that is within the program component; and
code that performs encapsulation analysis to determine whether any variable corresponding to said each instance field could undergo a state modification of a second type, said second type state modification being made by
at least one method that is not within the program component;
code that classifies said each instance field as immutable if no possible state modifications or breakages of encapsulation are found;
code that classifies said each instance field as mutable if possible state modifications or breakages of encapsulation are found; and
code that classifies said each instance field as undecided if there is insufficient class mutability information;
code that re-classifies said undecided class as mutable if any instance fields in said undecided class are mutable;
code that re-classifies said undecided class as immutable if all instance fields in said undecided class are immutable;
code that repeats said testing each undecided class code until a number of undecided classes after a repetition of said testing code is identical to a number of undecided classes before the repetition of said testing code;
code that re-classifies remaining undecided classes as mutable classes; and
code that tests mutability of each class field in each class.

54. The computer system as recited in claim 53, wherein the code that tests mutability of a field, whether said field is an instance field or a class field, is comprised of:
code that determines whether any variable corresponding to said field being tested could undergo a state modification of a first type, said first type state modification being made by at least one method that is within said program component; and code that performs encapsulation analysis to determine whether any variable corresponding to said field being tested could undergo a state modification of a second type, said second type state modification being made by at least one method that is not within said program component;

code that classifies said field being tested as immutable if no possible state modifications or breakages of encapsulation are found;

code that classifies said field being tested as undecided if there is insufficient class mutability information; and code that classifies said field being tested as mutable otherwise.

55. The computer system as recited in claim 54, wherein the code that determines whether any variable could undergo first type state modification comprises:

code that detects possible first type state modification of a value held in said each variable; and code that detects possible first type state modification of a state of any object referenced by said each variable, wherein a state of an object is modified if it can change after said object is initialized, and the state of an object is a set of states of all associated variables, and a variable is mutable if its state ever changes after said variable is initialized, the state of said variable being its value together with a state of any referenced object.

56. The computer system as recited in claim 54, wherein the code that performs encapsulation analysis comprises:

code that detects possible second type state modification of a value of said each variable;

code that detects possible second type state modification of a state of any object referenced by said each variable, said possible second type state modification of a state of any object occurring at a point of initialization; and code that detects possible breakage of variable encapsulation, wherein a state of an object is modified if it can change after said object is initialized, and the state of an object is a set of states of all associated variables, a variable is mutable if its state ever changes after said variable is initialized, the state of said variable being its value together with a state of any referenced object, a variable is encapsulated if all references to objects reachable from it are defined within said component, and variable encapsulation is broken if a method within the program component causes a mutable object reachable from a variable to become accessible to at least one method that is not within said component.

57. The computer system as recited in claim 53, wherein the program component is implemented in an object oriented environment, said instance fields being non-static fields, an instance variable being initialized upon completion of its corresponding <init> method, and said class fields being static fields, a class variable being initialized upon completion of its corresponding <clinit> method.

58. The computer system as recited in claim 53, wherein the at least one computer-readable memory further includes:

code that identifies an object as mutable if it is an instance of a mutable class;

code that identifies an object as immutable if it is an instance of an immutable class; and code that identifies fields and objects that can be determined to be constants because said identified fields and objects are not in a set of detected mutable fields and objects.

59. The computer system as recited in claim 53, wherein the at least one computer-readable memory further includes: code that identifies isolation faults due to detected mutable class fields.

60. A computer system for detecting mutability of variables, objects, fields, and classes in a program component, said component being written in an object-oriented programming language, the computer system comprising:

at least one computer-readable memory including:

code that maintains a layer of at least one core library and at least one data-flow analysis engine in a mutability analyzer, for providing a particular abstraction of the program component;

code that maintains a layer of at least one utility module in a mutability analyzer, for using the results of the at least one data analysis engine to generate basic results; and code that maintains a layer of at least one mutability sub-analysis module in a mutability analyzer, for generating final results, wherein a variable is mutable if its state ever changes after said variable is initialized, the state of said variable being its value together with a state of any referenced object, an object is mutable if its state ever changes after said object is initialized, the state of said object being a set of states of all associated variables, a field is mutable if any variable corresponding to said field is mutable, and a class is mutable if any instance fields implemented by said class are mutable.

61. The computer system as recited in claim 60, wherein the code that maintains the layer of at least one core library and at least one data analysis engine comprises:

code that collects and manipulates static information about the program component by analyzing a set of classfiles; and code that effectively constructs the program component's reference, hierarchy, and call graphs.

62. The computer system as recited in claim 60, wherein the code that maintains the layer of at least one core library and at least one data analysis engine comprises: code that allows a user to read classfiles.

63. The computer system as recited in claim 60, wherein the code that maintains the layer of at least one core library and at least one data analysis engine comprises: code that iteratively computes an effect of an instruction on information associated with locations on a method frame, said method frame being an operand stack and a local variables array.

64. The computer system as recited in claim 60, wherein the code that maintains the layer of at least one core library and at least one data analysis engine comprises: code that computes the effect of a method on information associated with variables that still exist upon completion of this method.

65. The computer system as recited in claim 60, wherein the code that maintains the layer of at least one utility module comprises: code that identifies a set of possible types for each instruction and each frame location in each method.

66. The computer system as recited in claim 60, wherein the code that maintains the layer of at least one utility module comprises: code that identifies, for each method, a set of escaping objects and class variables from which a mutable object is reachable for each instruction and each frame location referring to said mutable object.

67. The computer system as recited in claim 60, wherein the code that maintains the layer of at least one mutability sub-analysis module comprises: code that identifies, for each method, a set of fields whose corresponding instance and class variables may be set within said each method.

68. The computer system as recited in claim 60, wherein the code that maintains the layer of at least one mutability sub-analysis module comprises: code that identifies, for each method, a set of reference-type fields and method parameters, said set of reference-type fields and method parameters referencing an object, a state of said object being modified by said each method.

69. The computer system as recited in claim 60, wherein the code that maintains the layer of at least one mutability sub-analysis module comprises: code that identifies, for each variable, whether its value may be modified directly by at least one method that is not within the program component.

70. The computer system as recited in claim 60, wherein the code that maintains the layer of at least one mutability sub-analysis module comprises:

code that detects possible accessibility of a state of each object, by determining if each variable associated with said object is encapsulated, wherein a variable is encapsulated if all references to objects reachable from it are defined within the program component, and said accessibility is made by at least one method that is not within the program component.

71. The computer system as recited in claim 60, wherein the code that maintains the layer of at least one mutability sub-analysis module comprises:

code that detects a possible breakage of encapsulation, wherein a variable is encapsulated if all references to mutable objects reachable from it are defined within the program components, and variable encapsulation is broken if a method within the program component causes a mutable object reachable from the variable to become accessible to at least one method that is not within the program component.

* * * * *

UNITED STATES PATENT AND TRADEMARK OFFICE
CERTIFICATE OF CORRECTION

PATENT NO. : 6,925,638 B1
APPLICATION NO. : 09/667430
DATED : August 2, 2005
INVENTOR(S) : Koved et al.

It is certified that error appears in the above-identified patent and that said Letters Patent is hereby corrected as shown below:

Column 1:
Claim 1 should read as follows:

1. A method of detecting mutability of variables, objects, fields, and classes in a program component executing on a computing device including a processor and memory, said component being created in an object-oriented programming language, the method comprising the steps of:
    determining whether any variable in the program component could undergo a state modification of a first type, said first type state modification being made by at least one method that is within the program component; and
    performing encapsulation analysis to determine whether any variable in the program component could undergo a state modification of a second type, said second type state modification being made by at least one method that is not within the program component, to identify an exposure of the variables of the program component to modification external to the program component,
    wherein a variable is mutable if its state ever changes after said variable is initialized, the state of said variable being its value together with a state of any referenced object,
    an object is mutable if its state ever changes after said object is initialized, said state of said object being a set of states of all associated variables,
    a field is mutable if any variable corresponding to said field is mutable, and
    a class is mutable if any instance fields implemented by said class are mutable.

Column 22:
Claim 7 should read as follows:

7. A method of detecting mutability of classes in a program component executing on a computing device including a processor and memory, said component being created in an object-oriented programming language, the method comprising the steps of:
    obtaining a set of classes, each of said classes being classified as one of mutable, immutable, and undecided;
    testing each undecided class, said test being comprised of the sub-steps of:
    testing each field in said undecided class being tested, said test being comprised of the sub-sub-steps of:
    determining whether any variable corresponding to said each field could undergo a state modification of first type, said first type state modification being made by at least one method that is within said component; and
    performing encapsulation analysis to determine whether any variable corresponding to said each field could undergo a state modification of a second type, said second type state modification being made by at least one method that is not within said component;

UNITED STATES PATENT AND TRADEMARK OFFICE
CERTIFICATE OF CORRECTION

| | | |
|---|---|---|
| PATENT NO. | : 6,925,638 B1 | |
| APPLICATION NO. | : 09/667430 | |
| DATED | : August 2, 2005 | |
| INVENTOR(S) | : Koved et al. | |

It is certified that error appears in the above-identified patent and that said Letters Patent is hereby corrected as shown below:

classifying said each field as immutable if no possible first type or second type state modifications are found;
      classifying said each field as undecided if there is insufficient class mutability information; and
      classifying said each field as mutable otherwise;
      re-classifying said undecided class as mutable if any fields in said undecided class are mutable;
      re-classifying said undecided class as immutable if all fields in said undecided class are mmutable;
      repeating said testing each undecided class step until a number of undecided classes after a repetition of said testing step is identical to a number of undecided classes before the repetition of said testing step; and
      re-classifying remaining undecided classes as mutable classes, to identify an exposure of variables of the program component to modification external to the program component.

Column:
Claim 8 should read as follows:

8. A method of detecting mutability of classes in a program component executing on a computing device including a processor and memory, said component being created in an object-oriented programming language, the method comprising the steps of:
      obtaining a set of classes, each of said classes being classified as one of mutable, immutable, and undecided; testing each undecided class, said test being comprised of the sub-steps of:
      testing each instance field in said undecided class being tested, said test being comprised of the sub-sub-steps of:
      determining whether any variable corresponding to said each instance field could undergo a state modification of first type, said first type state modification being made by at least one method that is within said component; and
      performing encapsulation analysis to determine whether any variable corresponding to said each instance field could undergo a state modification of a second type, said second type state modification being made by at least one method that is not within said component;
      classifying said each instance field as immutable if no possible first type or second type state modifications are found;
      classifying said each instance field as undecided if there is insufficient class mutability information; and
            classifying said each instance field as mutable otherwise;
      re-classifying said undecided class as mutable if any instance fields in said undecided class are mutable;

UNITED STATES PATENT AND TRADEMARK OFFICE
CERTIFICATE OF CORRECTION

| | | |
|---|---|---|
| PATENT NO. | : 6,925,638 B1 | Page 3 of 7 |
| APPLICATION NO. | : 09/667430 | |
| DATED | : August 2, 2005 | |
| INVENTOR(S) | : Koved et al. | |

It is certified that error appears in the above-identified patent and that said Letters Patent is hereby corrected as shown below:

re-classifying said undecided class as immutable if all instance fields in said undecided class are immutable;
      repeating said testing each undecided class step until a number of undecided classes after a repetition of said testing step is identical to a number of undecided classes before the repetition of said testing step; and
      re-classifying remaining undecided classes as mutable classes to identify an exposure of variables of the program component to modification external to the program component.

Claim 19 should read as follows:

19. A method of detecting mutability of classes and class variables in a program component executing on a computing device including a processor and memory, said component being created in an object-oriented programming, the method comprising the steps of:
      obtaining a set of classes, each of said classes being classified as one of mutable, immutable, and undecided;
      testing each undecided class said test being comprised of the sub-steps of:
      testing mutability of each instance field in said undecided class being tested;
      classifying an instance field as immutable if no possible state or encapsulation analysis modifications are found;
      classifying an instance field as undecided if there is insufficient class mutability information; and
      classifying an instance field as mutable otherwise;
      re-classifying an undecided class as mutable if any instance fields in said undecided class are mutable;
      re-classifying said undecided class as immutable if all instance fields in said undecided class are immutable;
      repeating said testing each undecided class step until a number of undecided classes after a repetition of said testing step is identical to a number of undecided classes before the repetition of said testing step;
      re-classifying remaining undecided classes as mutable classes; and
      testing mutability of each class field in each class to identify an exposure of variables of the program component to modification external to the program component.

UNITED STATES PATENT AND TRADEMARK OFFICE
CERTIFICATE OF CORRECTION

| | | |
|---|---|---|
| PATENT NO. | : 6,925,638 B1 | |
| APPLICATION NO. | : 09/667430 | |
| DATED | : August 2, 2005 | |
| INVENTOR(S) | : Koved et al. | |

It is certified that error appears in the above-identified patent and that said Letters Patent is hereby corrected as shown below:

Claim 26 should read as follows:

26. A device for detecting mutability of variables, objects, fields, and classes in a program component executing on a computing device Including a processor and memory, said component being created in an object-oriented programming language, the device comprising: memory for holding
 a layer of at least one core library and at least one data-flow analysis engine, for providing a particular abstraction of the program component;
 a layer of at least one utility module, for using the results of the at least one data analysis engine to generate basic results; and
 a layer of at least one mutability sub-analysis module for generating final results,
 wherein a variable is mutable if its state ever changes after said variable is initialized, the state of a variable being its value together with a state of any referenced object,
 an object is mutable if its state ever changes after said object is initialized, the state of an object being a set of states of all associated variables,
 a field is mutable if any variable corresponding to said field is mutable, and
 a class is mutable if any instance fields implemented by said class are mutable to identify an exposure of the variables of the program component to modification external to the program component.

Claim 38 should read as follows:

38. A computer system for detecting mutability of variables, objects, fields, and classes in a program component executing on a computing device including a processor and memory, said component being created in an object-oriented programming language, the computer system comprising:
 at least one computer-readable memory including:
 code that determines whether any variable in the program component could undergo a state modification of a first type, said first type state modification being made by at least one method that is within the program component; and
 code that performs encapsulation analysis to determine whether any variable in the program component could undergo a state modification of a second type, said second type state modification being made by at least one method that is not within the program component to identify an exposure of the variables of the program component to modification external to the program component,
 wherein a variable is mutable if its state ever changes after said variable is initialized, the state of said variable being its value together with a state of any referenced object,

UNITED STATES PATENT AND TRADEMARK OFFICE
CERTIFICATE OF CORRECTION

| | |
|---|---|
| PATENT NO. | : 6,925,638 B1 |
| APPLICATION NO. | : 09/667430 |
| DATED | : August 2, 2005 |
| INVENTOR(S) | : Koved et al. |

It is certified that error appears in the above-identified patent and that said Letters Patent is hereby corrected as shown below:

an object is mutable if its state ever changes after said object is initialized, the state of said object being a set of states of all associated variables,
        a field is mutable if any variable corresponding to said field is mutable, and
        a class is mutable if any instance fields implemented by said class are mutable.

Claim 45 should read as follows:

45. A computer system for detecting mutability of variables, objects, fields, and classes in a program component executing on a computing device including a processor and memory, said component being written in an object-oriented programming language, the computer system comprising:
    at least one computer-readable memory including:
code that obtains a set of classes, each of said classes being classified as one of mutable, immutable, and undecided;
    code that tests each undecided class, said test being comprised of:
code that tests each instance field in said undecided class being tested, said instance field testing code being comprised of:
    code that determines whether any variable corresponding to said each instance field could undergo a state modification of a first type, said first type state modification being made by at least one method that is within the program component; and
    code that performs encapsulation analysis to determine whether any variable corresponding to said each instance field could undergo a state modification of a second type, said second type state modification being made by at least one method that is not within the program component;
    code that classifies said each instance field as immutable if no possible state modifications or breakages of encapsulation are found;
    code that classifies said each instance field as mutable if possible state modifications or breakages of encapsulation are found; and
    code that classifies said each instance field as undecided if there is insufficient class mutability information;
    code that re-classifies said undecided class as mutable if any instance fields in said undecided class are mutable;
    code that re-classifies said undecided class as immutable if all instance fields in said undecided class are immutable;
    code that repeats said testing each undecided class code until a number of undecided classes after a repetition of said testing code is identical to a number of undecided classes before the repetition of said testing code; and
    code that re-classifies remaining undecided classes as mutable classes to identify an exposure of the variables of the program component to modification external to the program component.

UNITED STATES PATENT AND TRADEMARK OFFICE
CERTIFICATE OF CORRECTION

| | | |
|---|---|---|
| PATENT NO. | : 6,925,638 B1 | |
| APPLICATION NO. | : 09/667430 | |
| DATED | : August 2, 2005 | |
| INVENTOR(S) | : Koved et al. | |

It is certified that error appears in the above-identified patent and that said Letters Patent is hereby corrected as shown below:

Claim 53 should read as follows:

53. A computer system for detecting mutability of classes and class variables in a program component executing on a computing device including a processor and memory, said component being created in an object-oriented programming language, the computer system comprising:
at least one computer-readable memory including:
    code that obtains a set of classes, each of said classes being classified as one of mutable, immutable, and undecided;
    code that tests each undecided class, said test being comprised of:
    code that tests each instance field in said undecided class being tested, said instance field testing code being comprised of:
    code that determines whether any variable corresponding to said each instance field could undergo a state modification of a first type, said first type state modification being made by at least one method that is within the program component; and
    code that performs encapsulation analysis to determine whether any variable corresponding to said each instance field could undergo a state modification of a second type, said second type state modification being made by at least one method that is not within the program component;
    code that classifies said each instance field as immutable if no possible state modifications or breakages of encapsulation are found;
    code that classifies said each instance field as mutable if possible state modifications or breakages of encapsulation are found; and
    code that classifies said each instance field as undecided if there is insufficient class mutability information;
    code that re-classifies said undecided class as mutable if any instance fields in said undecided class are mutable;
    code that re-classifies said undecided class as immutable if all instance fields in said undecided class are immutable;
    code that repeats said testing each undecided class code until a number of undecided classes after a repetition of said testing code is identical to a number of undecided classes before the repetition of said testing code;
    code that re-classifies remaining undecided classes as mutable classes; and
    code that tests mutability of each class field in each class to identify an exposure of the variables of the program component to modification external to the program component.

UNITED STATES PATENT AND TRADEMARK OFFICE
CERTIFICATE OF CORRECTION

PATENT NO. : 6,925,638 B1
APPLICATION NO. : 09/667430
DATED : August 2, 2005
INVENTOR(S) : Koved et al.

It is certified that error appears in the above-identified patent and that said Letters Patent is hereby corrected as shown below:

Claim 60 should read as follows:

60. A computer system for detecting mutability of variables, objects, fields, and classes in a program component executing on a computing device including a processor and memory, said component being created in an object-oriented programming language, the computer system comprising:
  at least one computer-readable memory including:
  code that maintains a layer of at least one core library and at least one data-flow analysis engine in a mutability analyzer, for providing a particular abstraction of the program component;
  code that maintains a layer of at least one utility module in a mutability analyzer, for using the results of the at least one data analysis engine to generate basic results; and
  code that maintains a layer of at least one mutability sub-analysis module in a mutability analyzer, for generating final results,
  wherein a variable is mutable if its state ever changes after said variable is initialized, the state of said variable being its value together with a state of any referenced object,
  an object is mutable if its state ever changes after said object is initialized, the state of said object being a set of states of all associated variables,
  a field is mutable if any variable corresponding to said field is mutable, and
  a class is mutable if any instance fields implemented by said class are mutable to identify an exposure of the variables of the program component to modification external to the program component.

Signed and Sealed this

Twenty-first Day of November, 2006

JON W. DUDAS
*Director of the United States Patent and Trademark Office*